(12) United States Patent
Gao et al.

(10) Patent No.: US 12,301,325 B2
(45) Date of Patent: May 13, 2025

(54) METHOD OF PANEL-SPECIFIC REPORTING FOR DL AND UL TRANSMISSION

(71) Applicant: ZTE CORPORATION, Guangdong (CN)

(72) Inventors: Bo Gao, Shenzhen (CN); Zhaohua Lu, Shenzhen (CN); Yu Ngok Li, Shenzhen (CN); Huahua Xiao, Shenzhen (CN); Shujuan Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 158 days.

(21) Appl. No.: 17/671,698

(22) Filed: Feb. 15, 2022

(65) Prior Publication Data

US 2022/0173784 A1 Jun. 2, 2022

Related U.S. Application Data

(63) Continuation of application No. PCT/CN2019/101153, filed on Aug. 16, 2019.

(51) Int. Cl.
| | | |
|---|---|---|
| *H04K 1/10* | (2006.01) | |
| *H04B 7/06* | (2006.01) | |
| *H04B 7/08* | (2006.01) | |
| *H04L 27/28* | (2006.01) | |
| *H04W 24/10* | (2009.01) | |

(52) U.S. Cl.
CPC ......... *H04B 7/0691* (2013.01); *H04B 7/0874* (2013.01); *H04W 24/10* (2013.01)

(58) Field of Classification Search
CPC ... H04B 7/0691; H04B 7/0874; H04W 24/10; H04W 72/21; H01Q 1/246

USPC ........ 375/260, 219, 220, 267, 299, 345, 347
See application file for complete search history.

(56) References Cited

U.S. PATENT DOCUMENTS

| | | | |
|---|---|---|---|
| 2015/0124736 A1 | 5/2015 | Ko et al. | |
| 2019/0081753 A1 | 3/2019 | Jung et al. | |
| 2019/0223033 A1 | 7/2019 | Nam et al. | |
| 2020/0106168 A1* | 4/2020 | Hakola | H01Q 1/246 |
| 2020/0169995 A1* | 5/2020 | Nam | H04W 72/21 |

FOREIGN PATENT DOCUMENTS

| | | |
|---|---|---|
| CN | 103370898 A | 10/2013 |
| CN | 105210308 A | 12/2015 |
| CN | 108288991 A | 7/2018 |
| CN | 109275356 A | 1/2019 |

(Continued)

OTHER PUBLICATIONS

U.S. Appl. No. 62/772,510, filed Nov. 28, 2018.*

(Continued)

*Primary Examiner* — Phuong Phu
(74) *Attorney, Agent, or Firm* — Foley & Lardner LLP

(57) ABSTRACT

A system and method for panel-specific reporting for DL and UL transmission. The system and method includes determining, by a wireless communication device, respective states to which the plurality of antenna groups are to be applied, wherein the plurality of antenna groups are associated with the wireless communication device. The method includes transmitting, by the wireless communication device to a wireless communication node, a report including the states or the information about the plurality of antenna groups.

20 Claims, 14 Drawing Sheets

(56) References Cited

FOREIGN PATENT DOCUMENTS

| WO | WO-2015/133812 A1 | 9/2015 |
| WO | WO-2017/074488 A1 | 5/2017 |

OTHER PUBLICATIONS

International Search Report and Written Opinion of the International Searching Authority for PCT/CN2019/101153 dated Feb. 21, 2020 (9 pages).

ZTE, "Discussion on DL beam management", 3GPP TSG RAN WG1 NR Ad-Hoc#2, R1-1710183, Qingdao, China, Jun. 30, 2017 (15 pages).

ZTE, "ZTE Enhancements on multi-beam operation," 3GPP TSG RAN WG1, Meeting #97, R1-1906237, Reno, Nevada, May 17, 2019 (18 pages).

First Office Action for CN Appl. No. 201980099426.8, dated Nov. 25, 2022 (with English translation, 49 pages).

ZTE, "Enhancements on Multi-beam operation," 3GPP TSG RAN WG1 Meeting #97, R1-1906237, May 17, 2019, Reno, USA (18 pages).

Extended European Search Report for EP Appl. No. 19942438.3, dated Jul. 8, 2022 (10 pages).

LG Electronics, "Feature lead summary of Enhancements on Multi-beam Operations", 3GPP TSG RAN WG1 Meeting #97, R1-1907650, May 17, 2019, Reno, USA (33 pages).

Office Action for CA Appl. No. 3,151,526, dated Feb. 21, 2024 (4 pages).

Office Action for KR Appl. No. 10-2022-7008151, dated Mar. 29, 2024 (with English translation, 7 pages).

* cited by examiner

METHOD OF PANEL-SPECIFIC REPORTING FOR DL AND UL TRANSMISSION

CROSS-REFERENCE TO RELATED APPLICATION

This application claims the benefit of priority under 35 U.S.C. § 120 as a continuation of PCT Patent Application No. PCT/CN2019/101153, filed on Aug. 16, 2019, the disclosure of which is incorporated herein by reference in its entirety.

TECHNICAL FIELD

The disclosure relates generally to wireless communications and, more particularly, to systems and methods for panel-specific reporting for DL and UL transmission.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In 5G NR, analog beamforming is firstly introduced into mobile communication for guaranteeing the robustness of high frequency communications.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method includes determining, by a wireless communication device, respective states to which the plurality of antenna groups are to be applied, wherein the plurality of antenna groups are associated with the wireless communication device. In some embodiments, the method includes transmitting, by the wireless communication device to a wireless communication node, a report including the states or the information about the plurality of antenna groups.

In one embodiment, the states include at least one of: an idle mode, an active mode, or an operative mode.

In one embodiment, the active mode includes at least one of: an active mode for a downlink transmission, an active mode for an uplink transmission, an active mode for a downlink transmission and an uplink transmission.

In one embodiment, the operative mode includes at least one of: an operative mode for a downlink transmission, an operative mode for an uplink transmission, an operative mode for an uplink transmission and an active mode for a downlink transmission, an operative mode for a downlink transmission and an active mode for an uplink transmission, and an operative mode for a downlink transmission and an uplink transmission.

In one embodiment, the method includes responsive to determining the respective states of one or more antenna groups of the plurality of antenna groups into the idle mode: preventing, by the wireless communication device, the one or more antenna groups of the plurality of antenna groups from performing a transmission.

In one embodiment, the method includes allowing, by the wireless communication device responsive to determining the respective states of one or more antenna groups of the plurality of antenna groups into the active mode or the operative mode, the one or more antenna groups of plurality of antenna groups to perform a transmission.

In one embodiment, the method includes allowing, by the wireless communication device responsive to determining the respective states of one or more antenna groups of the plurality of antenna groups into the active mode or the operative mode, transmission parameters associated with the one or more antenna groups of the plurality of antenna groups or the plurality of antenna groups to be applied for a transmission.

In one embodiment, the method include an uplink (UL) transmission is performed with the plurality of antenna groups, or allowing transmission parameters associated with the plurality of antenna groups to be applied for a transmission.

In one embodiment, the information about the plurality of antenna groups comprises an index associated with the plurality of antenna groups or one or more indexes associated with the respective antenna groups within the plurality of antenna groups, wherein the respective states of the plurality of antenna groups correspond with an active mode.

In one embodiment, the information about the plurality of antenna groups comprises an index associated with the plurality of antenna groups, one or more indexes associated with the respective antenna groups within the plurality of antenna groups, or information indicating activation or deactivation.

In one embodiment, the information about the plurality of antenna groups further comprises an index associated with the plurality of antenna groups or one or more indexes associated with the respective antenna groups within the plurality of antenna groups, wherein the respective states of the plurality of antenna groups are switched.

In one embodiment, the states comprise a bitmap, and wherein bits of the bitmap are associated with the respective antenna groups within the plurality of antenna groups.

In one embodiment, the report further comprises one or more reference signal (RS) resources.

In one embodiment, respective states of the plurality of antenna groups corresponds with an active mode.

In one embodiment, the method includes transmitting, by the wireless communication device to the wireless communication node, a maximum number of antenna groups having respective states corresponding with an active mode.

In one embodiments, the method includes transmitting, by the wireless communication device to the wireless communication node, a maximum number of antenna groups having respective states corresponding with an operative mode.

In one embodiments, the method includes detecting, by the wireless communication device, an occurrence of at least one of an internal overheating associated with the wireless communication device, a maximum power reduction greater than or equal to a first predetermined threshold, an uplink (UL) power backoff greater than or equal to a second predetermined threshold, a Block Error Rate (BLER) greater than or equal to a third predetermined threshold, or a Reference Signal Receive Power (RSRP) less than or equal to a fourth predetermined threshold; and initiating, by the wireless communication device responsive to detecting the occurrence, the transmission of assistance information of a configurable bound for antenna group related parameters.

In one embodiment, the configurable bound for antenna group related parameters comprise a maximum number of antenna groups with an active mode or a maximum number of antenna groups with an operative mode.

In one embodiment, the method includes applying, by the wireless communication device, the plurality of antenna groups across all cells, a cell group, or a Control Resource Set (CORESET) group.

In one embodiment, the CORESET group is associated with an index associated with an Acknowledge/Negative-Acknowledge (ACK/NACK) codebook.

In one embodiment, the wireless communication device transmits the report via a Physical Uplink Shared Channel (PUSCH), a Physical Uplink Control Channel (PUCCH), a PRACH (Physical Random Access Channel), or a Media Access Control-Control Element (MAC-CE).

In one embodiment, the wireless communication device transmits the report to the wireless communication node using an aperiodic transmission, a semi-persistent transmission, or a periodic transmission.

In one embodiment, the method includes determining, by the wireless communication device responsive to an expiration of a timer, the respective states of one or more antenna groups corresponding with an idle mode, wherein the one or more antenna groups are associated with the timer.

In one embodiment, the method includes restarting, by the wireless communication device responsive to transmitting the report, the timer.

In one embodiment, an active mode for the state of one antenna group is valid for a time window.

In one embodiment, the respective states of the plurality of antenna groups remain in the active mode at least T1 time units after the report is transmitted, wherein T1 is an integer.

In one embodiment, the respective states of the plurality of antenna groups remain in the active mode until at least T2 time units after a second report is transmitted, wherein the second report includes the respective states of a plurality of antenna groups or the information about a plurality of antenna groups, and wherein T2 is an integer.

In one embodiment, the antenna group(s) included in the last M1 reports or last M2 antenna groups in the report(s) are in active mode, wherein M1 and M2 are positive integers.

In one embodiment, the method includes associating, by the wireless communication device and T3 time units after transmitting the report, a downlink (DL) reference signal (RS) associated with the plurality of antenna groups, wherein T3 is an integer.

In one embodiment, the method includes determining, by the wireless communication device and T4 time units after transmitting the report, a downlink (DL) reference signal (RS) associated with one or more antenna groups of the plurality of antenna groups as reference RS of a quasi-co location (QCL) assumption for a transmission, wherein T4 is an integer.

In one embodiment, the method includes precluding, by the wireless communication device and T5 time units after transmitting the report, a transmission of a downlink (DL) reference signal (RS) or a DL channel, wherein the DL RS or the DL channel are associated with a first antenna group, and wherein the first antenna group is not included in the report, wherein T5 is an integer.

In one embodiment, the method includes when the antenna group(s) associated with a reference signal (RS) are precluded from an active state or transitioned into an idle state, deactivating, by the wireless communication device, at least one of a channel-state-information (CSI) reporting, a CSI measurement, a transmission configuration indicator (TCI) state, a Control Resource Set (CORESET), a CORESET group, or a reference signal (RS), which are associated with the reference RS.

In one embodiment, the method includes receiving a confirming command corresponding to the report; and T6 time units after receiving the confirming command, transmission parameters corresponding to the plurality of antenna groups are applied, wherein T6 is an integer.

In one embodiment, the method includes receiving, by the wireless communication device, a plurality of downlink/uplink (DL/UL) resource dedicated to one or more antenna groups of the plurality of antenna groups; and determining, by the wireless communication device, transmission parameters of the downlink/uplink (DL/UL) resource based on the report or predefined values.

In one embodiment, a spatial relation of the UL resource are determined based on a DL RS, wherein the report further comprises the DL RS.

In one embodiment, the method includes maintaining, by the wireless communication device responsive not to receiving a confirming command from the wireless communication node after the report is transmitted, a current state of the plurality of antenna groups.

In one embodiment, the method includes determining, by the wireless communication device, a timing to apply transmission parameters associated with the plurality of antenna groups.

In one embodiment, the method includes updating, by the wireless communication device, the transmission parameters based on the timing; or switching, by the wireless communication device, the plurality of antenna groups to the states based on the timing. In one embodiment, determining the timing includes receiving, by the wireless communication device from a wireless communication node, a message including with one or more antenna groups, wherein the message is carried by a Downlink Control Information (DCI) command or a Media Access Control-Control Element (MAC-CE) command; and determining, by the wireless communication device, the timing to apply transmission parameters associated with the antenna groups based on the message.

In one embodiment, the timing is determined according to at least one of a valid data indication for a Physical Uplink Shared Channel (PUSCH) carrying the report, an expiration of a timer, an indication associated with the plurality of antenna groups and a Downlink Control Information (DCI), an indication associated with the plurality of antenna groups and a Media Access Control-Control Element (MAC-CE) command, a Hybrid Automatic Repeat Request-Acknowledge (HARQ-ACK) corresponding to a Physical Downlink Shared Channel (PDSCH) carrying a MAC-CE command carrying the report, or a DCI or a MAC-CE included a confirmation information for the reporting.

In one embodiment, or more antenna groups of the plurality of antenna groups are associated with transmission parameters, wherein the transmission parameters comprise a plurality of transmission configuration indicators (TCIs), a plurality of spatial relation parameters, or a plurality of an uplink (UL) power control parameter sets.

In one embodiment, the method includes applying, by the wireless communication device, transmission parameters for at least one of a downlink/uplink (DL/UL) channel or a reference signal (RS).

In one embodiment, the method includes deactivating, by the wireless communication device responsive to that one or more antenna groups are precluded in the report or transitioned into an idle mode, at least one of: a spatial relation information, an uplink (UL) channel, or a reference signal (RS).

In another embodiment, a method includes receiving, by a wireless communication device from a wireless communication node, a command indicating transmission parameters to be applied to a plurality of antenna groups of the wireless communication device. In some embodiments, the method includes determining, by the wireless communication device based on the command, a timing to applied the transmission parameters associated with the plurality of antenna groups.

In one embodiment, the method includes transmitting, by the wireless communication device to the wireless communication node, a maximum number of the antenna groups having respective states corresponding with the active mode.

In one embodiment, the method includes transmitting, by the wireless communication device to the wireless communication node, a maximum number of antenna groups having respective states corresponding with the operative mode.

In one embodiment, the method includes detecting, by the wireless communication device, an occurrence of at least one of an internal overheating associated with the wireless communication device, a maximum power reduction greater than or equal to a first predetermined threshold, an uplink (UL) power backoff greater than or equal to a second predetermined threshold, a Block Error Rate (BLER) greater than or equal to a third predetermined threshold, or a Reference Signal Receive Power (RSRP) less than or equal to a fourth predetermined threshold; and initiating, by the wireless communication device responsive to detecting the occurrence, transmission of assistance information of a configurable bound for antenna group related parameters.

In one embodiment, the configurable bound for antenna group related parameters comprising a maximum number of antenna groups with an active mode or a maximum number of antenna groups with an operative mode.

In one embodiment, the timing is determined according to a latency associated with the plurality of antenna groups transitioning from the idle state to the active state or the operative state.

In one embodiment, a latency of the timing is larger than or equal to a latency associated with the plurality of antenna groups transitioning from the idle state to the active state or the operative state.

In one embodiment, the method includes receiving, by a wireless communication node from a wireless communication device, a report including information about a plurality of antenna groups or respective states, wherein the plurality of antenna groups are associated with the wireless communication device.

In one embodiment, the method further comprising receiving, by the wireless communication node from the wireless communication device, a first UL transmission performed with the plurality of antenna groups; or receiving, by the wireless communication node from the wireless communication device, a second UL transmission, wherein the wireless communication device allowed the transmission parameters associated with the plurality of antenna groups to be applied to the second UL transmission.

In one embodiment, the method includes receiving, by the wireless communication node from the wireless communication device, a maximum number of antenna groups having respective states corresponding with an active mode.

In one embodiment, the method includes receiving, by the wireless communication node from the wireless communication device, a maximum number of antenna groups having respective states corresponding with an operative mode.

In one embodiment, the wireless communication node receives the report via a Physical Uplink Shared Channel (PUSCH), a Physical Uplink Control Channel (PUCCH), a PRACH (Physical Random Access Channel), or a Media Access Control-Control Element (MAC-CE).

In one embodiment, the method includes transmitting, by the wireless communication node to the wireless communication device, a confirming command corresponding to the report causing the wireless communication device to apply, T6 time units after receiving the confirming command, the transmission parameters corresponding to the plurality of antenna groups, wherein T6 is an integer.

In one embodiment, the method includes transmitting, by the wireless communication node to the wireless communication device, the plurality of downlink/uplink (DL/UL) resource dedicated to the one or more of the plurality of antenna groups, the plurality of downlink/uplink (DL/UL) resources causing the wireless communication device to determine transmission parameters of the downlink/uplink (DL/UL) resource based on the report or predefined values.

In one embodiment, determining the timing includes transmitting, by the wireless communication node to the wireless communication device, a message including with one or more antenna groups, wherein the message is carried by a Downlink Control Information (DCI) command or a Media Access Control-Control Element (MAC-CE) command, the message causing the wireless communication device to determine the timing to apply transmission parameters associated with the antenna groups based on the message.

In one embodiment, the method includes transmitting, by a wireless communication node to a wireless communication device, a command indicating transmission parameters to be applied to a plurality of antenna groups of the wireless communication device, the command causing the wireless communication device to determine, based on the command, a timing to applied the transmission parameters associated with the plurality of antenna groups.

In one embodiment, the method includes receiving, by the wireless communication node from the wireless communication device, a maximum number of the antenna groups having respective states corresponding with the active mode.

In one embodiment, the method includes receiving, by the wireless communication node from the wireless communication device, a maximum number of antenna groups having respective states corresponding with the operative mode.

The above and other aspects and their embodiments are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXEMPLARY EMBODIMENTS

Figure 1:
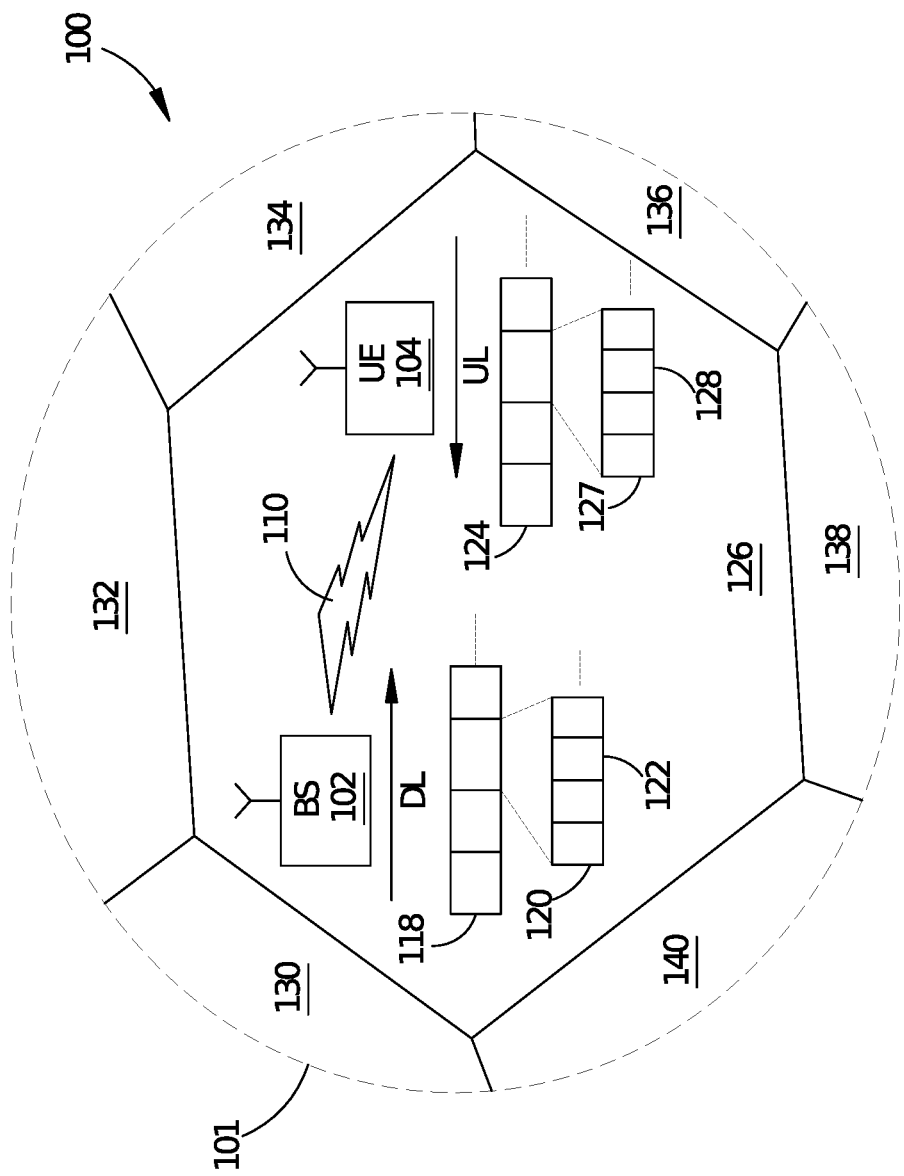
FIG. 1 illustrates an example cellular communication network in which techniques disclosed herein may be implemented, in accordance with an embodiment of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

3GPP 3rd Generation Partnership Project
5G 5th Generation Mobile Networks
5G-AN 5G Access Network
5G gNB Next Generation NodeB
5G NR 5th Generation Mobile Networks New Radio
BWP Bandwidth Part
CORESET Control Resource Set
CP Cyclic Prefix
CSI-RS Channel State Information Reference Signal
DCI Downlink Control Information
DL Downlink
DMRS Demodulation Reference Signal
HARQ Hybrid Automatic Repeat Request
gNB gNodeB
MAC-CE Medium Access Control Control Element
MIMO Multiple Input Multiple Output
OFDM Orthogonal Frequency-Division Multiplexing
PBCH Physical Broadcast Channel
PDCCH Physical Downlink Control Channel
PDSCH Physical Downlink Sharing Channel
PRACH Physical Random Access Channel
PUCCH Physical Uplink Control Channel
PUSCH Physical Uplink Sharing Channel
RS Reference Signal
RSRP Reference Signal Received Power
SRS Sounding Reference Signal
SS Synchronization Signal
STxMP Simultaneous Transmission Across Multiple Panel
TCI Transmission Configuration Indicator
TDD Time-Domain Duplex
TRP Transmission Point
TXRU Transceiver Units
QCL Quasi Co-Location
UE User Equipment
UL Uplink In 5G NR, analog beam-forming is firstly introduced into mobile communication for guaranteeing the robustness of high frequency communications. For DL transmission, quasi-co location (QCL) state (also, the QCL state is called as transmission configuration indicator (TCI) state) has been introduced for supporting beam indication for DL control channel, i.e., physical downlink control channel (PDCCH), DL data channel, i.e., physical downlink sharing channel (PDSCH), and channel-state-information reference signaling (CSI-RS). Similarly, for UL transmission, spatial relation information (for the perspective of spec, the corresponding higher layer parameter is called as spatialRelationInfo) has been introduced for supporting beam indication for UL control channel, i.e., physical uplink control channel (PUCCH), and sounding reference signal (SRS). Besides, beam indication for UL data channel, i.e., physical uplink shared channel (PUSCH), is achieved through mapping between one or more SRS resources, which are indicated by gNB, and ports of the UL data channel. That means that the beam configuration for UL data channel can be derived from the spatial relation information associated with the SRS resources or ports accordingly.

From the spec perspective, current 5G NR solution is based on the scenario that there is only a single panel in the UE side, which means that only one DL TX beam can be received, or only one UL TX beam can be transmitted at a given time instant. In order words, if UE have multiple panels, the panel activation or deactivation is totally up to UE implementation.

However, this architecture of beam management has serious limitation on transmission performance and UE-side power saving, when the UE actually has multiple panel. For transmission performance (regardless of DL and UL transmission), simultaneous multi-beam transmission by enabling multi panel operation simultaneously can support higher RANK transmission and get spatial diversity gain, which means that the channel capacity can be improved significantly; for UE-side power saving, due to lack of UE-side preference about panel state (such as idle or active) and measurement results for each of panel, some low-performance panel may always be active if the UL beam of the panel is configured for dynamic switching by gNB.

Accordingly, a panel-specific reporting framework for DL and UL transmission is recommended here. In general, and discussed in greater detail below, the following issues for panel-specific reporting should be handled.

First, panel-specific information can be reported to gNB side from UE, in order to enable the panel-specific information interaction between gNB and UE sides. To be specific, the function can be divided into three categories: (a) UE panel states are up to UE; (b) UE panel states can be requested by UE but are up to gNB configuration/confirmation; (c) upper bound of active UE panel can be flexibly requested by UE assistance information, but UE panel states are up to gNB configurations.

Second, the configuration framework for transmission parameters and corresponding timeline for panel switching should be considered to be grouped or switched together, in order to support dynamical panel switching. When UE panel state (e.g., two active panels) is switched to another state (e.g., an active panel), the transmission parameters for PUCCH, PUSCH, SRS and PRACH (e.g., number of DMRS ports and UL power control parameters for PUSCH) should be updated simultaneously under a pre-defined timeline.

Third, taking into account the UE driven panel switching (or panel switching request), the default UE behavior for UL and DL transmission after updated by UE or confirmed by gNB should be considered. For instance, after receiving gNB response for confirming panel switching requested by UE side, the default QCL assumption for DL channel and the default UL spatial relation and power control parameters for UL channel should be specified accordingly.

Mobile Communication Technology and Environment

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
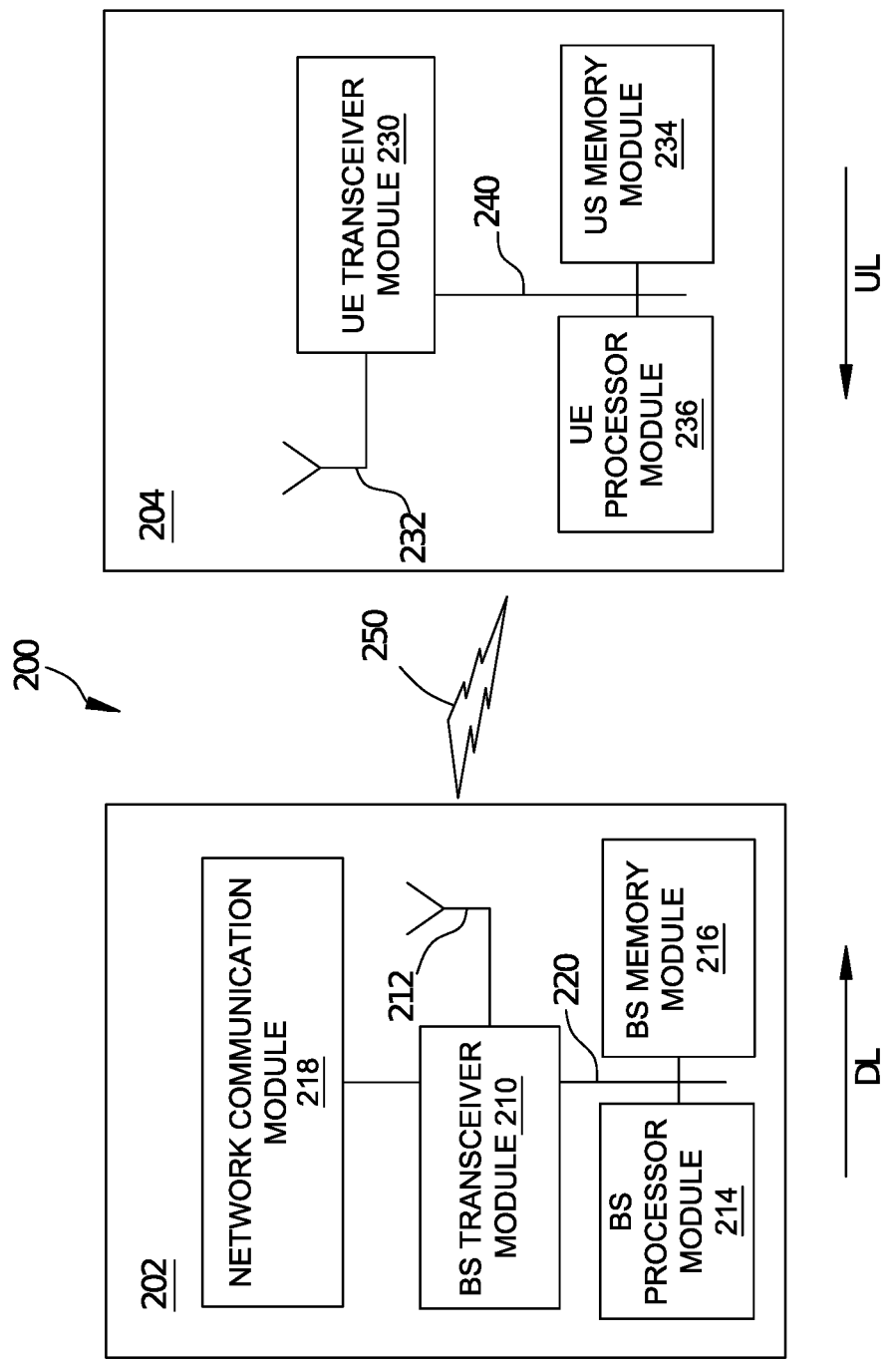
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Control (PDCL) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Panel-Specific Reporting (PSR) for DL and UL Transmission

Figure 3:
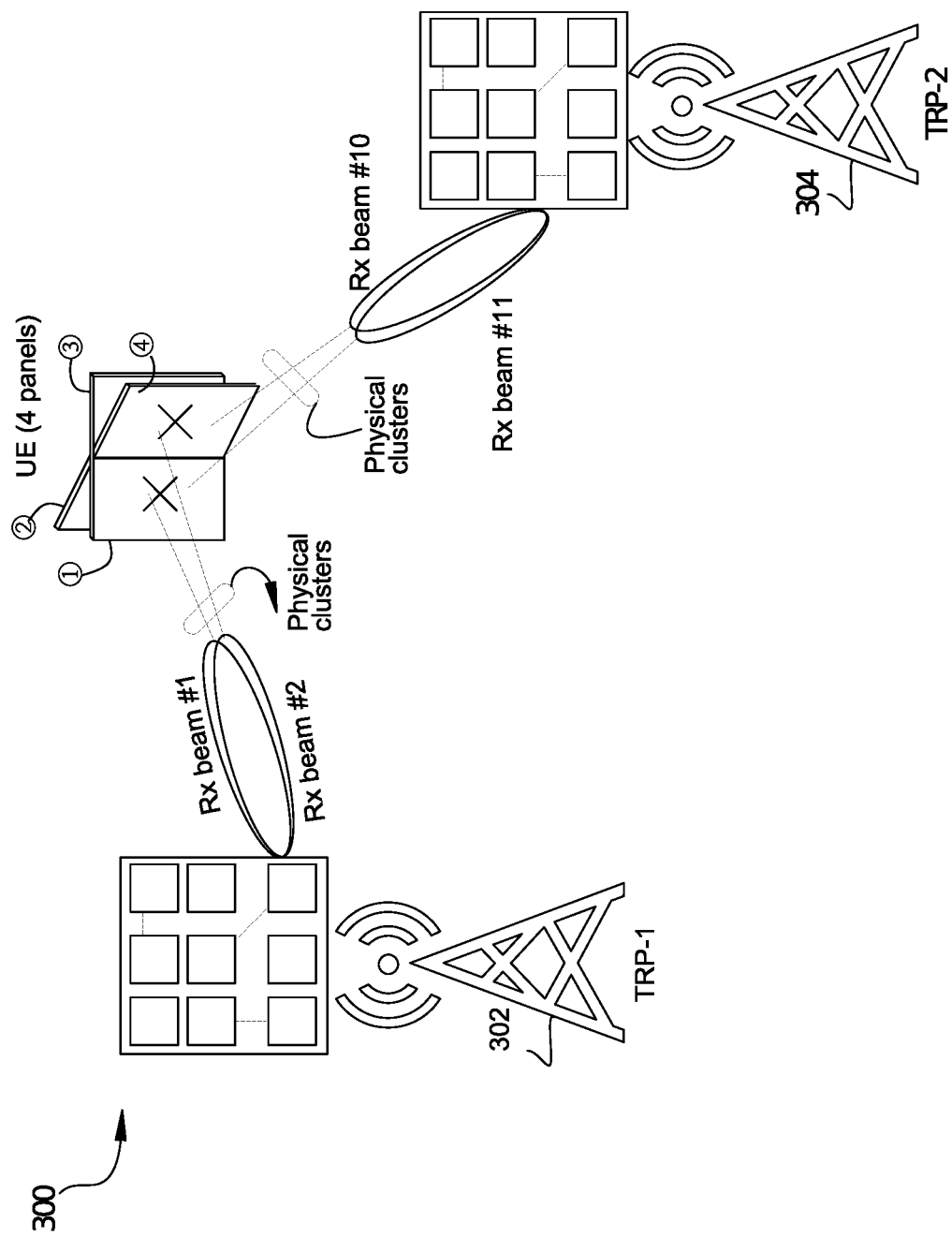
FIG. 3 illustrates a block diagram of an example environment of a 5G system for beam measurement and reporting where the UE side has four panels, in accordance with some embodiments of the present disclosure.

FIG. 3 illustrates a block diagram of an example environment of a 5G system for beam measurement and reporting where the UE side has four panels, in accordance with some embodiments of the present disclosure. The environment 300 includes various components, such as a TRP 302 (shown in FIG. 3 as, TRP-1), a TRP 304 (shown in FIG. 3 as, TRP-2), a UE (not shown in FIG. 3) that includes multi-panels 306 (shown in FIG. 3 as, UE (4 panels)). In some embodiments, the UE (not shown in FIG. 3) may be UE 104 in FIG. 1. Although shown with only one component of each type, the environment 300 may include any number of components (e.g., a plurality of UEs, a plurality of TRP 302, a plurality of TRP 304, etc.) interconnected in any arrangement to facilitate the operations of the 5G system, as described herein.

As the expense of wide or ultra-wide spectrum resources, the considerable propagation loss induced by the extremely high frequency becomes a noticeable challenge. To solve this, antenna array and beam-forming training technologies using massive MIMO, e.g., up to 1024 antenna elements for one node, have been adopted to achieve beam alignment and obtain sufficiently high antenna gain. To keep low implementation cost while still benefit from antenna array, analog phase shifters become very attractive for implementing mmWave beam-forming, which means that the number of controllable phases is finite and the constant modulus constraints are placed on these antenna elements. Given the pre-specified beam patterns, the variable-phase-shift-based BF training targets to identify the best pattern for subsequent data transmission generally, in the one-TRP and one-panel case.

Generally, the multi-TRP (e.g., TRP 302, TRP 304) and multi-panel cases should be considered for beyond 5G gNB (base station) and the next-generation communications, and meanwhile there are multiple panels for UE in order to cover whole space for enhancing coverage. As a typical case, a panel for TRP and UE sides has two TXRUs, which are associated with cross polarization accordingly. Therefore, in order to achieve high RANK or multi-layer transmission, the TRP and UE should try to use different beams generated from different panels, which is also called as simultaneous transmission across multiple panel (STxMP), with objective of sufficiently using capability of each panel, such as its associated TXRUs.

PSR: General Description for Antenna Group Based Reporting

Figure 4:
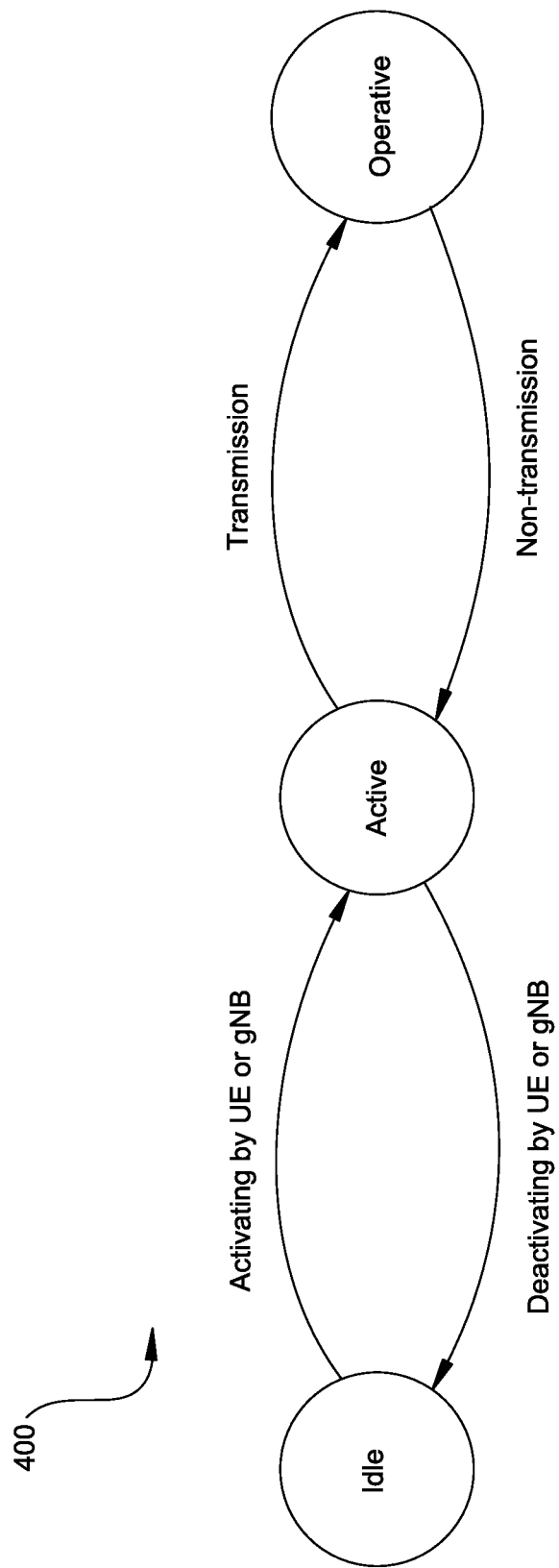
FIG. 4 illustrates a block diagram of an example environment of a state switching for an antenna group operation from the perspective of a UE, in accordance with some embodiments of the present disclosure.

FIG. 4 illustrates a block diagram of an example environment of a state switching for an antenna group operation from the perspective of a UE, in accordance with some embodiments of the present disclosure. The environment 400 shows three states (also referred to herein as modes): an idle state (shown in FIG. 4 as idle 402), an active state (shown in FIG. 4 as, active 404), and an operative state (shown in FIG. 4 as, operative 406). The environment 400 shows the transition from the idle state 402 to the active state 404 indicating an activation by an UE (e.g., UE 104 in FIG. 1) or a gNB (e.g., BS 102 in FIG. 1) from the idle state 402. The environment 400 shows a transition from the active state 404 to the operative state 406, indicating a transmission of UE 104. The environment 400 shows a transition from the operative state 406 to the active state 404 indicating a non-transmission. The environment shows a transition from the active state 404 to the idle state 402 indicating a deactivation by the UE 104 or BS 102.

The states of antenna groups are reported from UE to gNB, in order to guarantee that gNB should be aware of the state of antenna groups in UE. In some embodiments, the state of a UE antenna group can be idle, active and/or operative modes. In some embodiments, the procedure of antenna group based reporting is preformed when the antenna group related reporting mode is configured.

In idle mode (e.g., idle state 402), the antenna group can NOT be used for transmission dynamically, and there is a large latency of reactivating the idle antenna group to active or operative one. In some embodiments, the idle mode can be divided into several sub-modes with respective latency for each of the sub-modes to become active or operative mode. For instance, the antenna group with idle mode is powered off, and, in the typical case, the latency of switching idle mode to active or operative mode is 3 millisecond (ms).

In active mode (e.g., active state 404), the antenna group can be used for transmission dynamically. Besides, the latency of switching to the operative mode for DL and UL transmission is very short, e.g., less than the duration of a cyclic prefix (CP), a few OFDM symbols and the same latency as antenna switching. For instance, the antenna group with active mode have already been powered on and can be used for transmission dynamically, e.g., scheduled by a DCI command.

In operative mode (e.g., operative state 406), the antenna group is used for DL or UL transmission. Once the antenna group is not scheduled for any transmission, this mode shall be fall back to active mode directly.

In some embodiments, the operative mode can be assumed as a case of active mode.

Consequently, the state switching for antenna group operation in UE side is shown in FIG. 4.

In some embodiments, the maximum number of antenna group with the active or operative modes is up to UE capability. For instance, one UE can have four antenna groups, e.g., four UE panels. Then, up to 2 antenna groups can be in the active mode, and only 1 antenna group can be in the operative mode. In some embodiments, the maximum number of antenna groups for reception is up to UE capability in a given time; the maximum number of antenna groups for transmission is up to UE capability in a given time.

In some embodiments, there are only two modes of idle and active, and meanwhile there are restriction for maximum number of antenna groups to be used for transmission or reception.

In some embodiments, when considering both DL and UL transmission, the states of antenna group can be re-organized as follows: Idle mode, Active mode for DL only, Active mode for UL only, Active mode for both DL and UL, Operative mode for UL but active mode for DL, Operative mode for DL but active mode for UL, Operative mode for DL and UL mode From the perspective of antenna group, the subset of the above states can be supported. For instance, one antenna group in TDD and antenna-group/beam correspondence only supports: idle mode, active mode for both DL and UL, operative mode for UL but active mode for DL, operative mode for DL but active mode for UL.

Furthermore, when considering both DL and UL transmission, the states of antenna groups can be re-organized as follows: Idle mode, Active mode for DL only, Active mode for UL only, Active mode for both DL and UL.

Furthermore, at least one of the antenna group related information should be included in the antenna group based report format. The antenna group related information may include (1) Information of one or more active antenna groups, (2) Information of state changing of antenna groups, (3) Information of antenna group and information of reference signal (RS) resource, and (4) upper bound of active antenna groups.

In the case of information of one or more active antenna groups, the index of active antenna groups is provided. In some embodiments, the antenna groups to be reported shall be active, K1 time units after the report is transmitted, where K1 is an integer. In some embodiments, the antenna groups to be reported in the last reported should be active, until K2 time units after the report is transmitted, where K2 is an integer.

In the case of information of state changing of antenna groups (e.g., the activation or deactivation of antenna group) two options are provided.

In the first option, the indexes of antenna group and the corresponding flags of activating or deactivating are provided in the report format. In some embodiments, the activating or deactivating behavior should be effective, S1 time units after the report is transmitted. That means that UE antenna-group states are up to UE.

In the second option, the indexes of antenna group is provided in the report format. In some embodiments, S2 time units after the report is transmitted, the idle or active state of antenna group in the report shall be switched to the active or idle state. That means that UE antenna-group states are up to UE.

In the case of information of antenna group and information of reference signal (RS) resource, the antenna group to be reported is in active mode. The association between one antenna group and one or more RS resources are provided, which means that the one of the one or more RSs can be received by the associated antenna group in a given time. In some embodiments, when the states of antenna groups are up to UE, the rules for clarifying states of antenna groups based on reporting results should be specified. In some embodiments, the antenna groups in last M1 reports or last M2 antenna groups to be reported are in active model, taking into account the restriction for maximum number of active UE antenna groups, where M1 and M2 are integers. In some embodiments, only antenna group(s) in the last report are in active mode. In some embodiments, the information of antenna group is in active mode T time units after the report is transmitted. In some embodiments, the antenna group should be assumed as idle upon timer expire, where the timer is re-started when the antenna group associated with the timer is reported.

In the case of upper bound of active antenna groups, the maximum number of antenna groups with active mode is requested by UE assistance information. In some embodiments, the maximum number of antenna groups with operative mode is requested by UE assistance information. Consequently, the gNB shall re-configure or re-activate the parameters related to antenna group to meet the requirement of upper bound of active antenna groups. For instance, in the initial stage, the maximum number of active antenna groups X1 is reported as UE capability. But, upon detecting internal overheating, or upon detecting that it is no longer experiencing an overheating condition, the maximum number of active antenna group X2 is reported. After that, the gNB shall re-configure the corresponding transmission parameter to satisfy this requirement.

In some embodiments, when antenna group based report is only assumed as the request message, the changing of states of UE antenna group is finally determined according to the subsequent gNB configuration message, e.g., activation or deactivation command for antenna groups or confirming the request message carrying the antenna group based report.

In some embodiments, the antenna group can be applied across all cells, cell group, or CORESET group. In some embodiments, the CORESET group is associated with the same index for ACK/NACK codebook. For instance, one CORESET group is served by one respective TRP.

In some embodiments, the antenna group based report can be carried by PUSCH, PUCCH, PRACH or MAC-CE.

Figure 5:
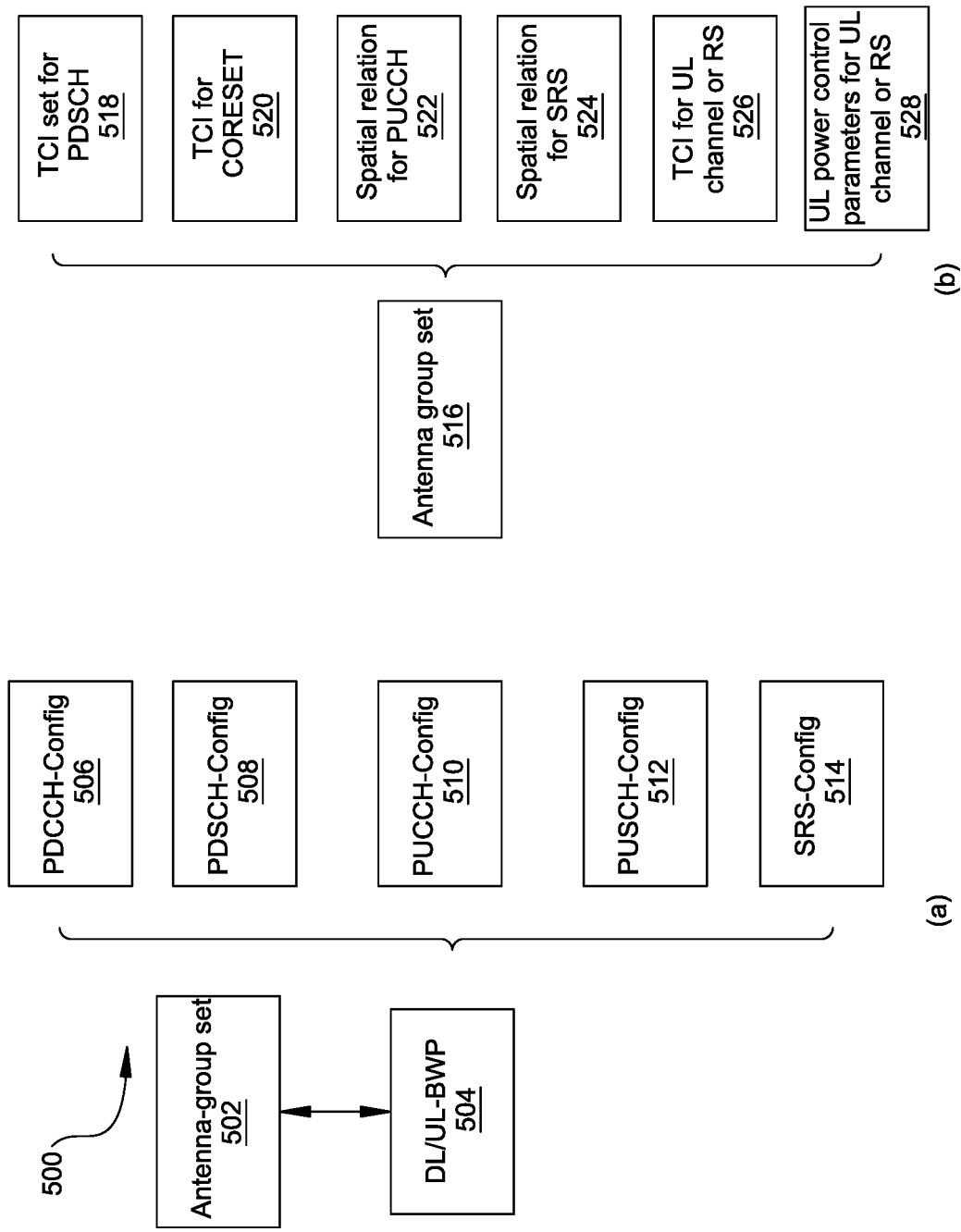
FIG. 5 illustrates a framework for an association between an antenna-group set and transmission parameters, in accordance with some embodiments of the present disclosure.

PSR: Framework for Parameter Configuration and Timeline for AG Indication by gNB FIG. 5 illustrates frameworks for an association between an antenna-group set and transmission parameters, in accordance with some embodiments of the present disclosure. The frameworks 500 includes a configuration framework (a) and a configuration framework (b). The configuration framework (a) includes an antenna-group set 502 and a DL/UL-BWP 504. The DL/UL-BWP 504 includes a PDCCH-Config 506, a PDSCH-Config 508, a PUCCH-Config 510, a PUSCH-Config 512, and a SRS-Config 514. The configuration framework (b) includes an antenna-group set 516 that includes a TCI set for PDSCH 518, a TCI for CORESET 520, a spatial relation for PUCCH 522, a spatial relation for SRS 524, a TCI for UL channel or RS 526, and UL power control parameters for UL channel or RS 528.

When one set of active antenna groups (AG) is switched to another set, the transmission parameters for DL and UL channels should be updated simultaneously. For instance, the TCI state for PDSCH transmission is provided by the scheduled DCI command, which is selected from one set of TCI states activated by MAC-CE; once the active antenna group is switched, the previous set of TCI states is out of date and UE can NOT indicate a correct TCI state corresponding to the newly active antenna group.

Consequently, at least one of the following features can be configurable in the framework of parameter configuration: (1) The antenna group set is associated with a DL/UL BWP configuration parameter where the DL/UL BWP configuration parameter includes the DL/UL channel or RS configuration parameter and/or (2) the antenna group set is associated with TCI, spatial relation or UL power control parameters, which is used for DL/UL channel or RS.

Regarding feature (1), the antenna group set is associated with a DL/UL BWP configuration parameter where the DL/UL BWP configuration parameter includes the DL/UL channel or RS configuration parameter. In some embodiments, the configuration framework is described in the configuration framework (a) in FIG. 5.

In some embodiments, once the active antenna group set is switched from one set to another, the DL/UL BWP is switched simultaneously. In some embodiments, the above behavior can be driven by gNB through DCI or MAC-CE commands, or driven by UE through antenna-group based reporting. In some embodiments, a new MAC-CE or DCI signaling carrying the antenna group set can be introduced for activating or switching panel associated with the group ID.

In some embodiments, then DL/UL BWP is switched from one to the other, the antenna group set of which is assumed to be active.

Regarding feature (2), the antenna group set is associated with TCI, spatial relation or UL power control parameters, which is used for DL/UL channel or RS. In some embodiments, the configuration framework is described in the configuration framework (b) in FIG. 5.

In some embodiments, one channel or RS can be associated with multiple antenna groups. In some embodiments, when the antenna group is active, the TCI or spatial relation parameter is applied or valid.

In some embodiments, one channel or RS can be associated with multiple TCI, spatial relation or UL power control parameters, each of which is associated with one antenna groups. In some embodiments, in a given time, only the TCI or spatial relation parameters associated with the active antenna group set is valid.

In some embodiments, the DL channel can be PDCCH, CORESET, or PDSCH.

In some embodiments, the UL channel can be PUCCH, PUSCH, or PRACH.

In some embodiments, the DL RS can be DMRS, or CSI-RS.

In some embodiments, the DL RS can be DMRS, SRS.

The time point for applying transmission parameters is determined according to at least one of following, where it is irrespective of activating or deactivating an antenna group: (1) the report including antenna group, (2) the valid new data indication for a PUSCH carrying the report message, (3) expiration of a timer, which is restarted when the report including antenna group is transmitted, (4) DCI or MAC-CE including an indication information for the antenna group, (5) HARQ-ACK corresponding to the PDSCH carrying the MAC-CE command associated with the antenna group, and (6) DCI or MAC-CE carry a confirmation information for the request message of antenna group states.

Figure 6:
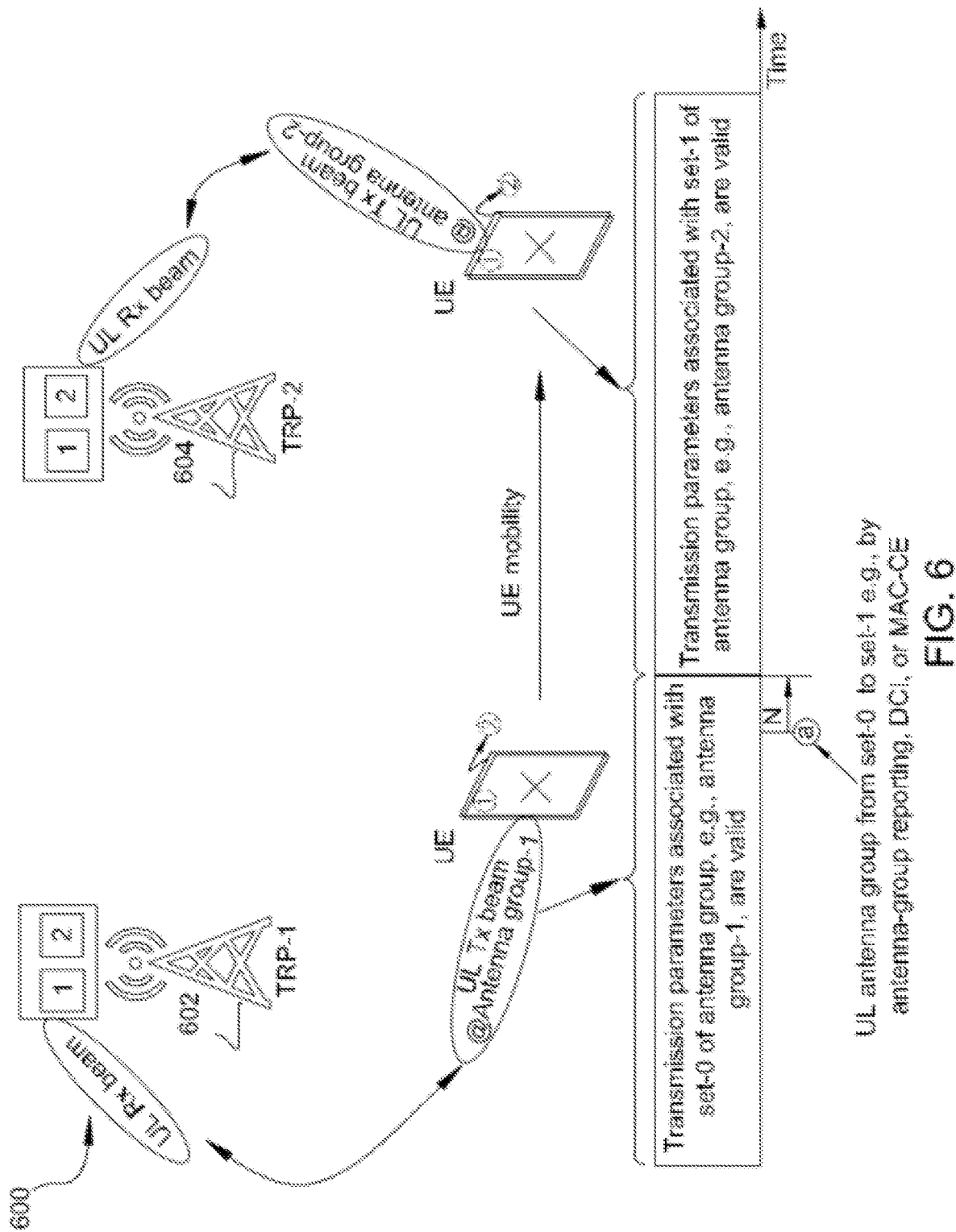
FIG. 6 illustrates a block diagram of an example environment of a 5G system for updating transmission parameters based on pre-configured association when an antenna-group set is switched from one set to another one, in accordance with some embodiments of the present disclosure.

FIG. 6 illustrates a block diagram of an example environment of a 5G system for updating transmission parameters based on pre-configured association when an antenna-group set is switched from one set to another one, in accordance with some embodiments of the present disclosure. The environment 600 includes various components, such as a TRP 602 (shown in FIG. 6 as, TRP-1), a TRP 604 (shown in FIG. 6 as, TRP-2), a UE (not shown in FIG. 6) that includes panel 606 and panel 608.

That is, FIG. 6 illustrates an example for updating transmission parameter according to antenna group switching, where one UE (e.g., UE 104 in FIG. 1) have 2 antenna group (i.e., 2 UE panels). In the initial stage, the UL Tx beam of antenna group 1 is used for transmission, and the TRP-1 is to serve the UE. That means that the transmission parameters associated with set-0 of antenna group is valid. Then, due to the consideration of resource allocation (e.g., overload of TRP-1) or UE mobility, the UL transmission shall be switched from UE antenna group 1 to UE antenna group 2. Subsequently, at the time point a, the UE antenna group is switched from set-0 to set-1 by antenna group reporting, MAC-CE or DCI command, and N time units after the time point a, the transmission parameter associated with set-1 of antenna group is valid accordingly.

In some embodiments, the transmission parameters for the new antenna group (set) should be pre-configured before the switching command. Conversely, there should be sufficient duration from the transmission point of a command carry the antenna group switching message to the effective point of the command.

PSR: Antenna Group State Determination Based on UE Reporting

Figure 7:
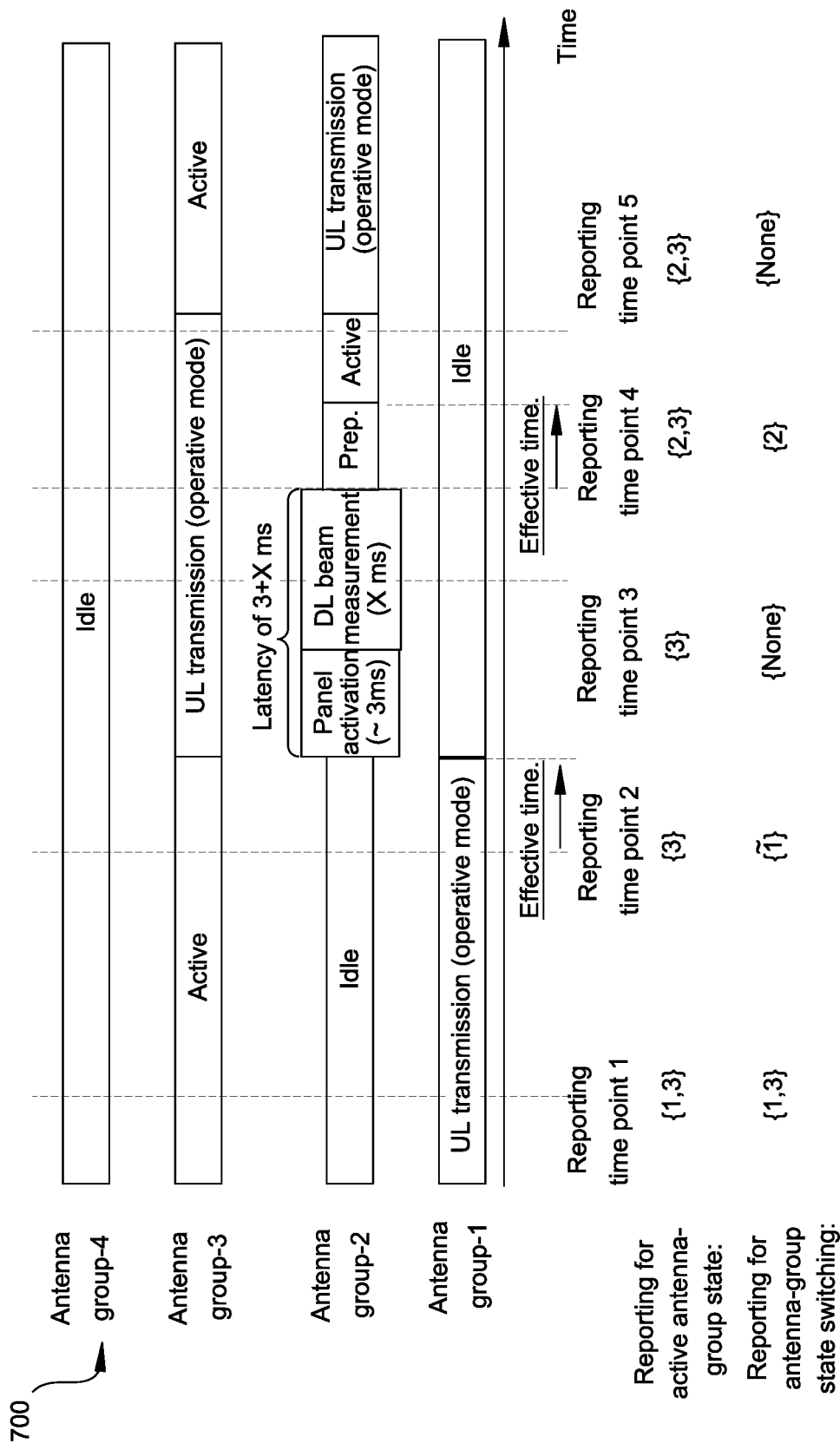
FIG. 7 illustrates a timing diagram of an example environment of a 5G system for a reporting procedure for active antenna group state or antenna group state switching, in accordance with some embodiments of the present disclosure.
Figure 8:
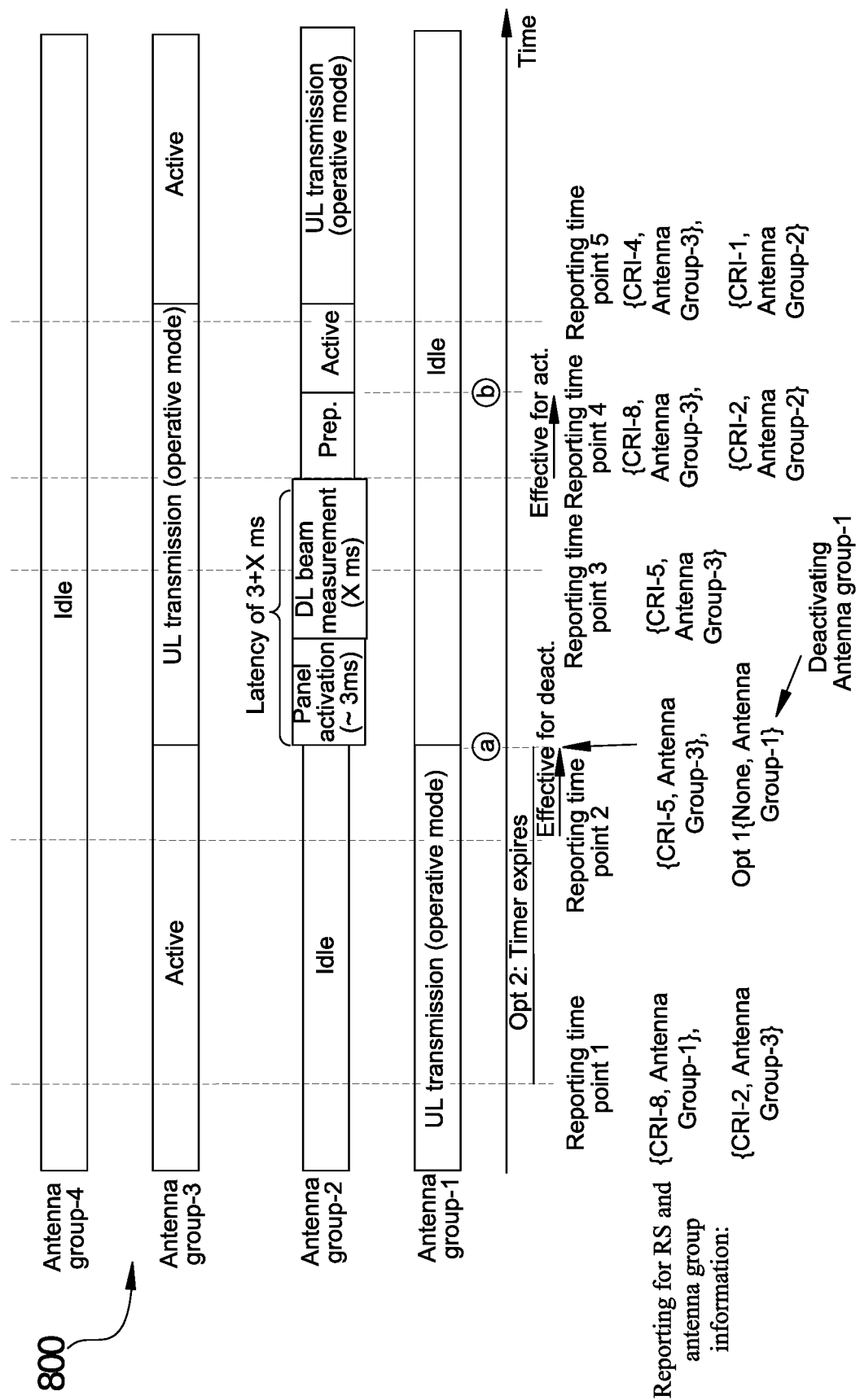
FIG. 8 illustrates a timing diagram of an example environment of a 5G system for a reporting procedure for RS and antenna group information, where multiple antenna groups can be reported, in accordance with some embodiments of the present disclosure.
Figure 9:
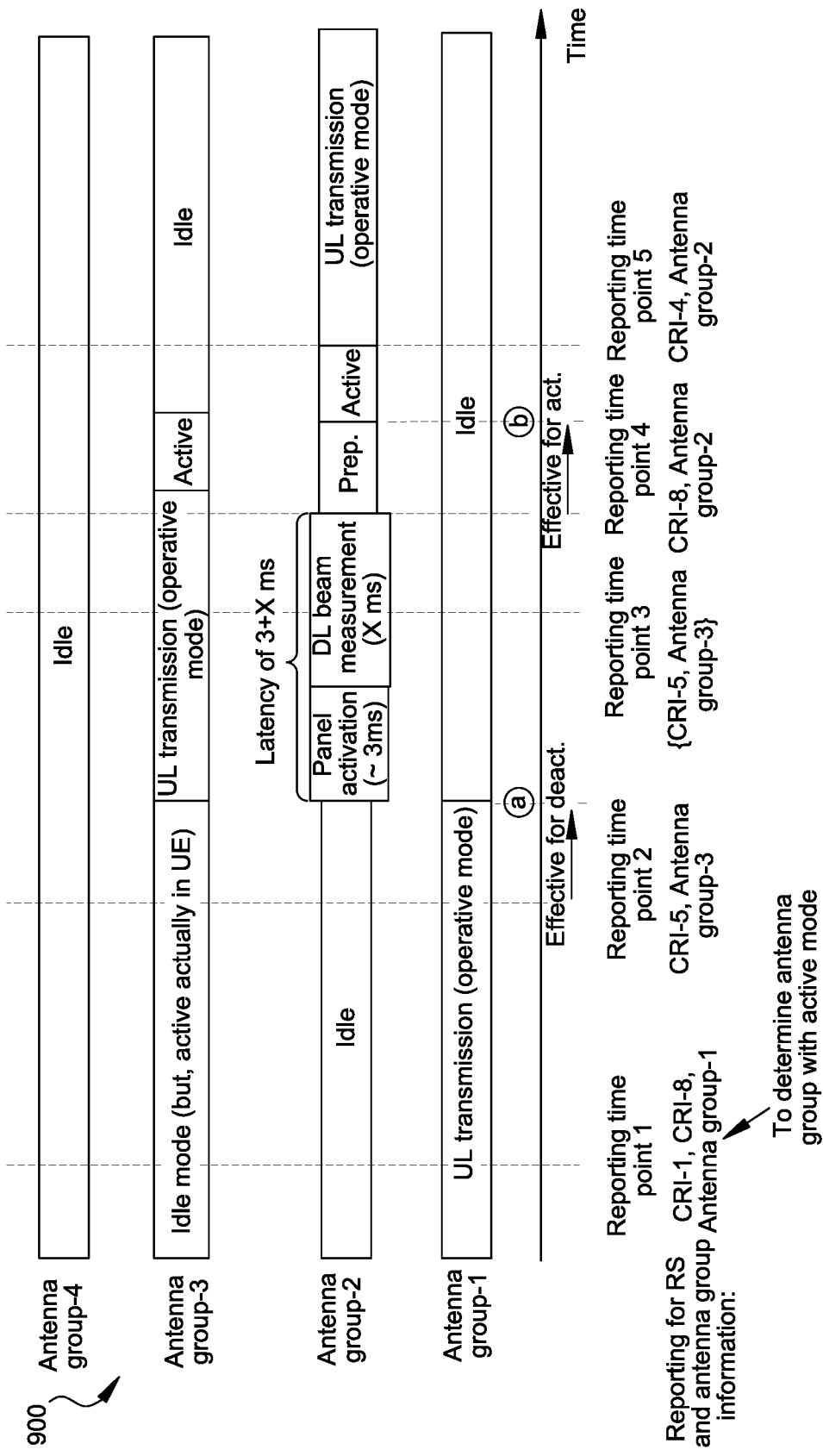
FIG. 9 illustrates a timing diagram of an example environment of a 5G system for a reporting procedure for RS and antenna group information, where up to one antenna group can be reported, in accordance with some embodiments of the present disclosure.

FIG. 7 illustrates a timing diagram of an example environment of a 5G system for a reporting procedure for active antenna group state or antenna group state switching, in accordance with some embodiments of the present disclosure. FIG. 8 illustrates a timing diagram of an example environment of a 5G system for a reporting procedure for RS and antenna group information, where multiple antenna groups can be reported, in accordance with some embodiments of the present disclosure. FIG. 9 illustrates a timing diagram of an example environment of a 5G system for a reporting procedure for RS and antenna group information, where up to one antenna group can be reported, in accordance with some embodiments of the present disclosure.

The antenna group state may be determined based on antenna group reporting. The following types of reporting format may be used for an antenna group based reporting: (1) reporting for active antenna group state, (2) reporting for antenna group state switching, (3) reporting for RS and antenna group information.

Regarding reporting format (1), the reporting may be for an active antenna group state. In some embodiments, information of active antenna group(s) is provided in the report. For instance, one example can be found in FIG. 7. At a reporting time point, the index of active antenna group is reports, and the report results is valid U1 time units after the reporting is transmitted, where U1 is an integer.

Regarding reporting format (2), the reporting may be for an antenna group state switching. In some embodiments, information of state changing of antenna groups, e.g., the activation or deactivation of antenna group, is provided in the report. For instance, one example can be found in FIG. 7. At a reporting time point, the index of antenna groups to be deactivating or activating is reported, and the UE antenna group states shall be updated U2 time units after the reporting is transmitted, where U2 is an integer.

Regarding reporting format (3), the reporting may be for RS and antenna group information. In some embodiments, information of antenna group and information of reference signal (RS) resource is provided in the reporting. For instance, one example can be found in FIG. 8, where multiple antenna groups can be reported.

In some embodiments, when the antenna group index and the corresponding RS information is reporting, the antenna group is activated. Furthermore, the antenna group is activated, U3 time units after the report is transmitted, where the U3 is an integer. If the last reporting also includes the antenna group index, the antenna group continues to be active.

In some embodiments, there are two following options for deactivating antenna groups. In the first option, when the antenna group index and the corresponding RS information is reported and the value of "the corresponding RS information" is "none", the antenna group is deactivated. The event occurs U4 time units after the report is transmitted, where U4 is an integer. In the second option, a timer is associated with an antenna group. The antenna group is in active mode and the timer is re-started when the antenna group is reported. Upon the timer expires, the antenna groups is deactivated.

For instance, another example can be found in FIG. 9, where up to one antenna group can be reported.

In some embodiments, only the reported antenna group can be assumed to be active one, and consequently all transmission should be based on the active antenna group. In some embodiments, the antenna group is in active mode, U5 time units after the antenna group is reported, where U5 is an integer. In some embodiments, the previous antenna group is assumed to be in idle mode, U6 time units after antenna group is reported, where U6 is an integer.

In some embodiments, when multiple reports contains different RS information for the same antenna group, gNB can configure or indicate any of the different RSs according to measurement results and scheduling requirement.

In some embodiments, idle or active mode is assumed in gNB side (from spec perspective), and even when the antenna group is in idle mode, the UE also can power on the antenna group and find some candidate beam pair (through DL beam measurement) for the subsequent transmission if required.

In some embodiments, the antenna group based report can be aperiodic, semi-persistent and periodic one.

PSR: Default behavior for DL and UL Transmission After Antenna Group Based Reporting For DL, after the report is transmitted, the antenna group in the report is activated or valid for transmission. In some embodiments, Q1 time units after the report message including an antenna group is transmitted, the DL RS associated with the antenna group can be indicated for DL transmission, where Q1 is an integer. In some embodiments, Q2 time units after the report message including one or more antenna groups, a DL RS is associated with the antenna group in report, where Q2 is an integer. In some embodiments, a set of candidate antenna groups can be configured for the reporting configuration, and the antenna group(s) in the report only can be selected from the set of candidate antenna groups.

In some embodiments, TCI state, CORESET or RS associated with (e.g., QCLed with) a reference RS is deactivated or released, once the antenna group(s) associated with the reference RS are precluded in the set of active antenna group.

In some embodiments, once an antenna group(s) are precluded in the set of active antenna group or are in idle mode, CSI reporting, CSI measurement, TCI state, CORESET or RS associated with the antenna group is deactivated or released.

For UL, after the report is transmitted, the antenna group in the report is activated or valid for transmission. In some embodiments, the DL RS associated with the antenna group can be indicated as spatial relation info. In some embodiments, a DL RS can be associated with the antenna group to be reported, Q3 time units after the report including the antenna group is transmitted. In some embodiments, it is precluded that, Q4 time units after the report including the antenna group is transmitted, the DL RS associated with different one from the antenna group is indicated.

In some embodiments, spatial relation info, UL channel or RS associated with a reference RS is deactivated or released, once the antenna group(s) of the reference RS are precluded in the set of active antenna group.

In some embodiments, once an antenna group(s) are precluded in the set of active antenna group or are in idle mode, spatial relation info, UL channel or RS associated with the antenna group is deactivated or released.

Figure 10:
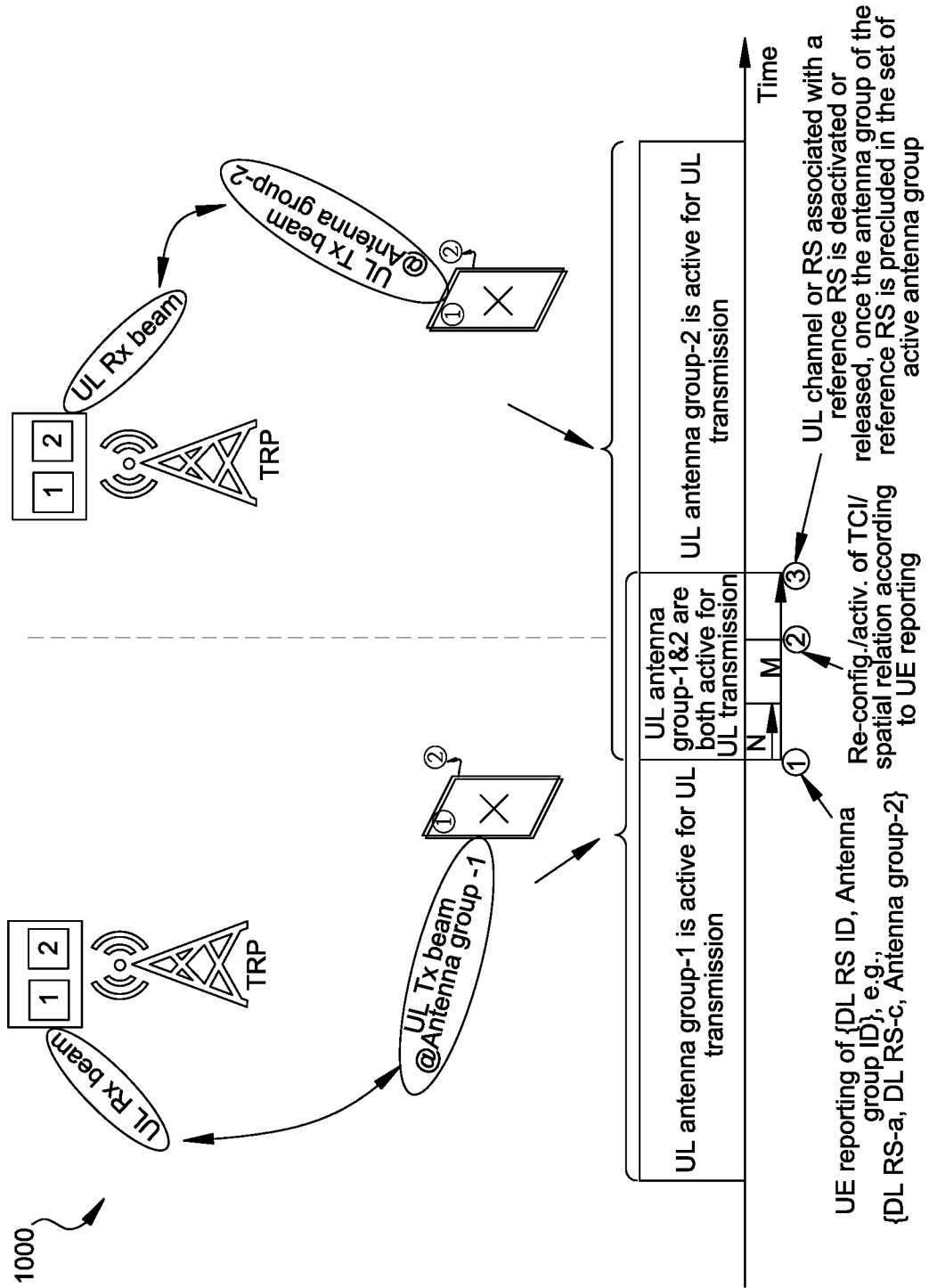
FIG. 10 illustrates a block diagram of an example environment of a 5G system depicting the default behavior for UL transmission after antenna group based reporting, in accordance with some embodiments of the present disclosure.

FIG. 10 illustrates a block diagram of an example environment of a 5G system depicting the default behavior for UL transmission after antenna group based reporting, in accordance with some embodiments of the present disclosure.

In the initial stage, the UL antenna group-1 is active for UL transmission. At the time point-1, the antenna group based reporting is transmitted, and several DL RS indexes and one antenna group ID is carried in the report. Specifically, {DL RS-a, DL RS-c, antenna group-2} is reported.

N time units after the time point-1, UL antenna group-2 besides UL antenna group-1 is also active. gNB can reconfigure or re-activate the transmission parameters, e.g., TCI state(s) for PDSCH, PDCCH and CSI-RS, or spatial relation info(s) for PUCCH and SRS, according to the report result.

M time units after the time point-1, UL antenna group-1 and RS and channel associated with the antenna group are deactivated or released.

PSR: Antenna Group Switching Request and gNB Response

There are multiple UEs to be served by only a gNB in a communication system, and consequently the preference of antenna group switching is not aligned with the resource allocation from gNB perspective. For instance, switching from antenna group-A to antenna group-B is recommended by UE, but the UL resources related with antenna group-B, e.g., TRP, panel of gNB side, have been fully overloaded. In such case, gNB may not confirming the antenna group switching request.

As a result, gNB should have a functionality of confirming or not confirming the request message of antenna group switching, where the report format of antenna group switching request is the same as the antenna group based reporting described in embodiments described herein (e.g., "General Description for Antenna Group Based Reporting").

After transmitting the report of antenna group switching request, UE shall monitor the gNB response, which can be divided into two options.

In the first option, indicating or reconfiguring the antenna group related transmission parameters. In this option, the gNB response can be assumed as a normal antenna group related transmission parameter reconfiguration, e.g., switching from one antenna group-related parameter set to another one. C1 time units after the indicating or reconfiguring the antenna group related transmission parameters, the newly indicated or reconfigured parameters are valid. C1 is an integer. In some embodiments, the newly active antenna groups may be or may not be the same as the recommended antenna groups in the previous request message In the second option, confirming the antenna group switching request. The gNB response is to confirm the corresponding antenna group switching request, and, C2 time units after receiving this request, the antenna group switching by the request message is valid. C2 is an integer. That means that the transmission parameters should be updated accordingly.

In some embodiments, the one dedicated DL and UL resources are configured for the antenna group switching, and the transmission parameters of the dedicated resource should be determined according to the antenna group switching request or as a pre-defined values. In some embodiments, the transmission parameters includes antenna group parameter, QCL assumption, spatial relation, or UL power control parameters. In some embodiments, the DL resource can be PDSCH, PDCCH, or CORESET. In some embodiments, the UL resource can be PUCCH, SRS or PUSCH.

In some embodiments, if the antenna group switching request is not confirmed and the gNB response has not been received C3 time units after the antenna group switching is transmitted, the UE shall keep the previous state of antenna group before transmitting the request message. C3 is an integer.

Figure 11:
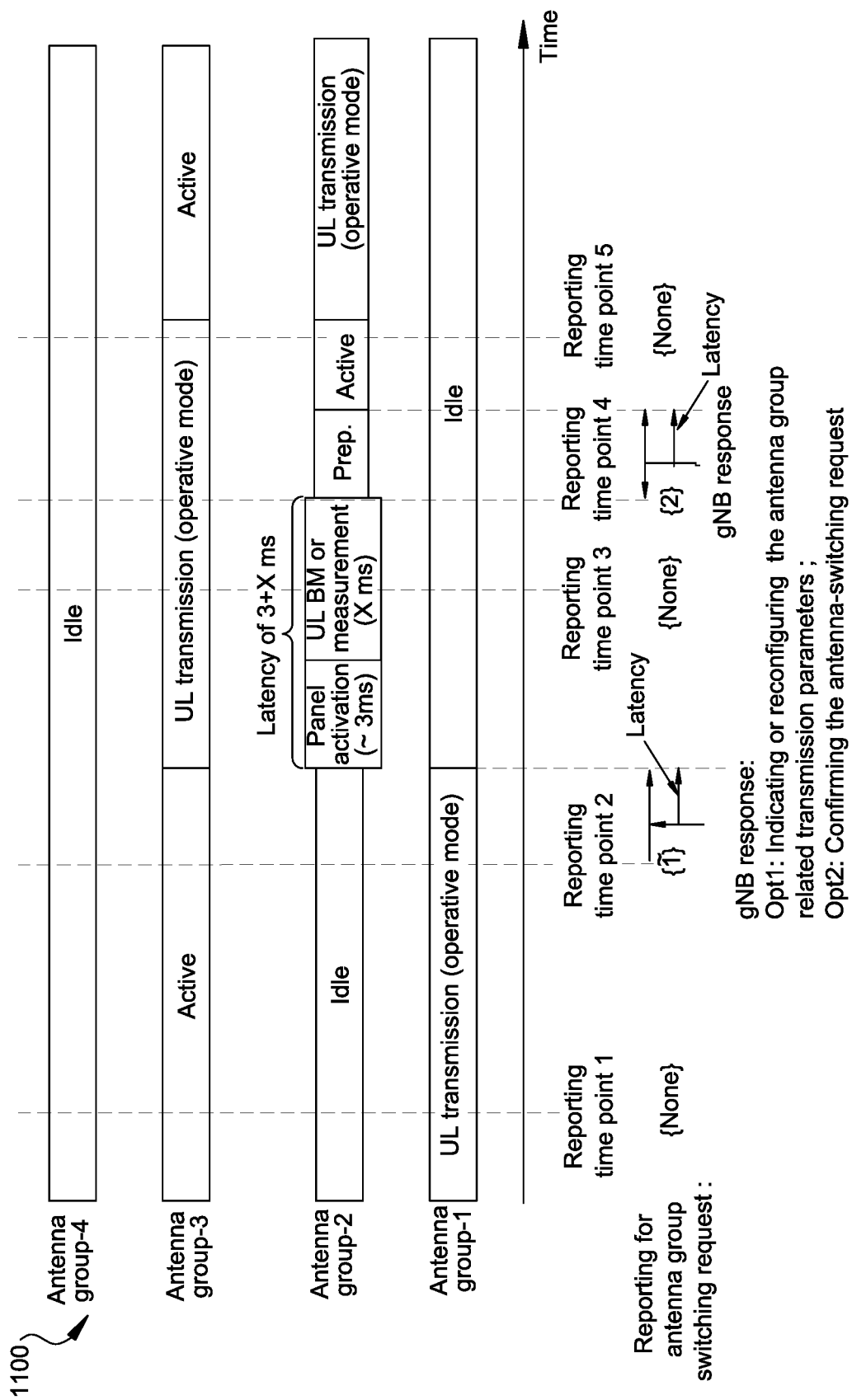
FIG. 11 illustrates a timing diagram of an example environment of a 5G system for reporting for antenna group switching request and gNB response, in accordance with some embodiments of the present disclosure.

FIG. 11 illustrates a timing diagram of an example environment of a 5G system for reporting for antenna group switching request and gNB response, in accordance with some embodiments of the present disclosure. At the reporting time point 2, de-activating antenna group-1 is requested, and UE shall monitor the gNB response. C2 time units after receiving the gNB response, i.e., confirming the request message, the antenna group 1 is assumed to be in idle mode. Similarly, at the reporting time point 4, the antenna group 2 is requested to be activated.

Figure 12:
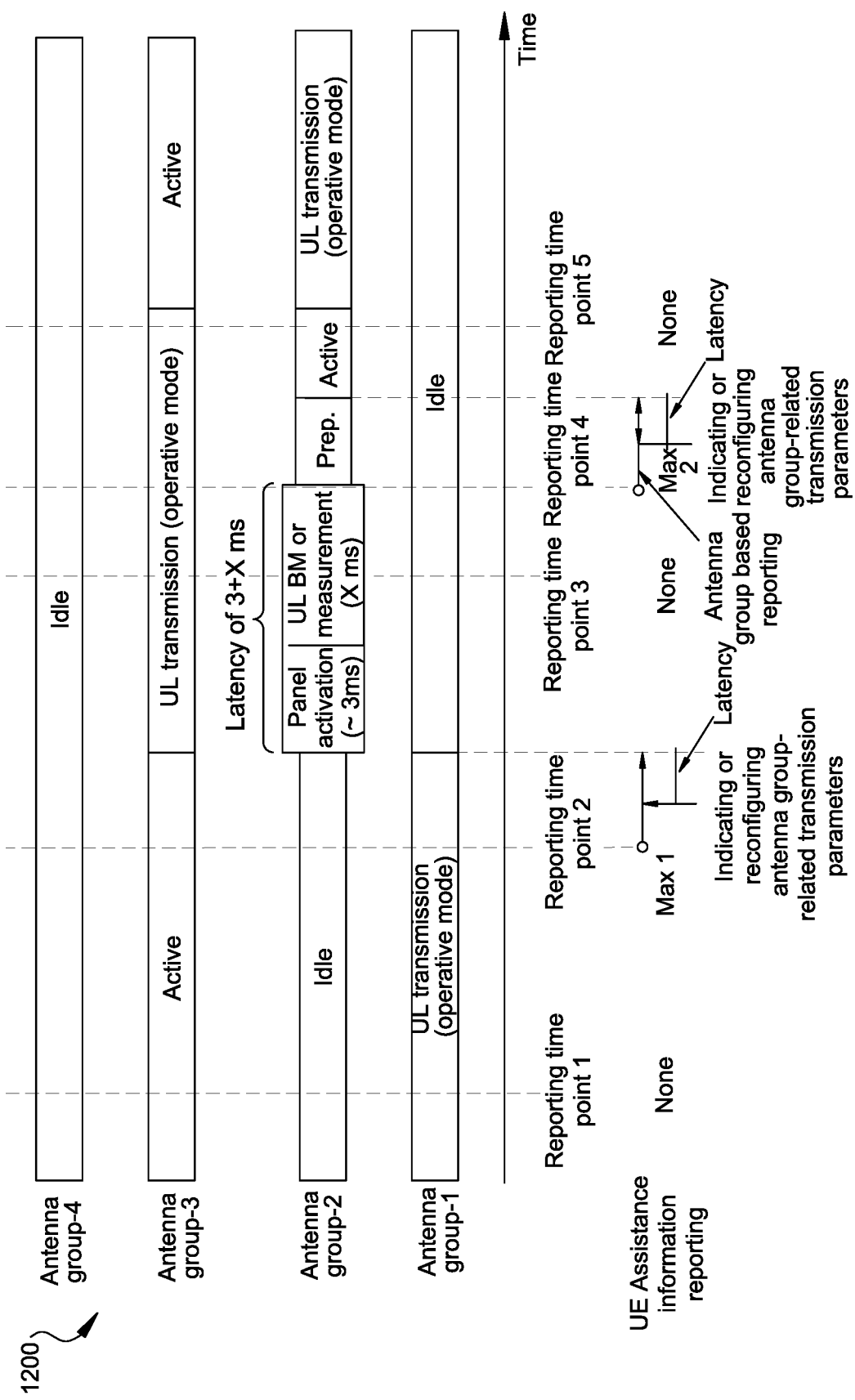
FIG. 12 illustrates a timing diagram of an example environment of a 5G system for UE assistance information reporting for active antenna groups, in accordance with some embodiments of the present disclosure.

PSR: UE AI for Reducing the Configurable Bound for Antenna Group Related Parameters FIG. 12 illustrates a timing diagram of an example environment of a 5G system for UE assistance information reporting for active antenna groups, in accordance with some embodiments of the present disclosure.

UE can initiate the UE assistance information for reducing the configurable bound for antenna group related parameters, upon detecting at least one of the following feature or that at least one of the following feature are not experienced: internal overheating, maximum power reduction is more than or equal to the threshold, UL power backoff is more than or equal to the threshold, BLER is more than or equal to the threshold, and/or RSRP is less than or equal to the threshold.

In some embodiments, the configurable bound for antenna group related parameters comprise the maximum number of antenna groups with active mode, or the maximum number of antenna groups with operative mode.

Once receiving this UE assistance information for reducing the configurable bound, gNB shall indicate or reconfigure antenna group related transmission parameter to meet the requirement. For instance, one example of UE assistance information reporting for active antenna groups is shown in FIG. 12, where the operative mode is also assumed as an active mode (with a real transmission). At reporting time point 2, max{1} for active antenna group is reported, and consequently gNB shall indicate or reconfigure antenna group related transmission parameters to deactivate one antenna group, e.g., antenna group-1. When it is no longer experiencing an overheating condition, the maximum number of active antenna group is increased to 2 through UE assistance information reporting. Before gNB reconfigure the antenna group-related transmission parameters, some antenna group based reporting is required to obtain the DL RS(s) and their antenna group ID with good transmission performance, e.g., RSRP.

Figure 13:
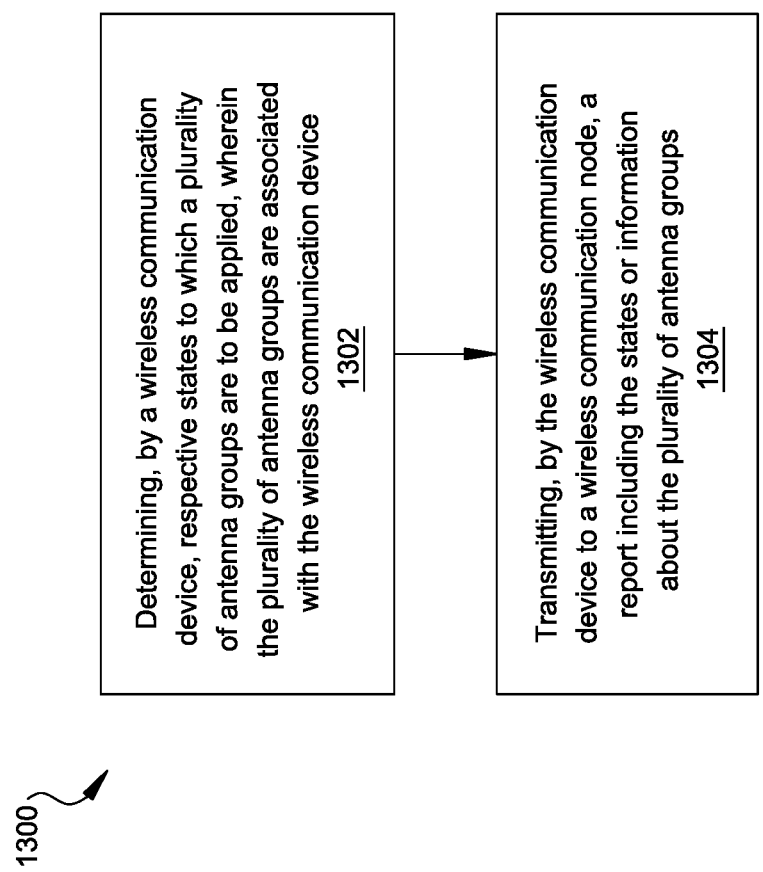
FIG. 13 is a flow diagram depicting a method for panel-specific reporting for DL and UL transmission from the perspective of a wireless communication device, in accordance with some embodiments of the present disclosure.

FIG. 13 is a flow diagram depicting a method for panel-specific reporting for DL and UL transmission from the perspective of a wireless communication device, in accordance with some embodiments of the present disclosure. Additional, fewer, or different operations may be performed in the method depending on the particular embodiment. In some embodiments, some or all operations of method 1300 may be performed by a wireless communication node, such as BS 102 in FIG. 1. In some operations, some or all operations of method 1300 may be performed by a wireless communication device, such as UE 104 in FIG. 1. Each operation may be re-ordered, added, removed, or repeated.

As shown, the method 1300 includes the operation 1302 of determining, by a wireless communication device, respective states to which a plurality of antenna groups are to be applied, wherein the plurality of antenna groups are associated with the wireless communication device. The method 1300 includes the operation 1304 of transmitting, by the wireless communication device to a wireless communication node, a report including the states or information about the plurality of antenna groups.

Figure 14:
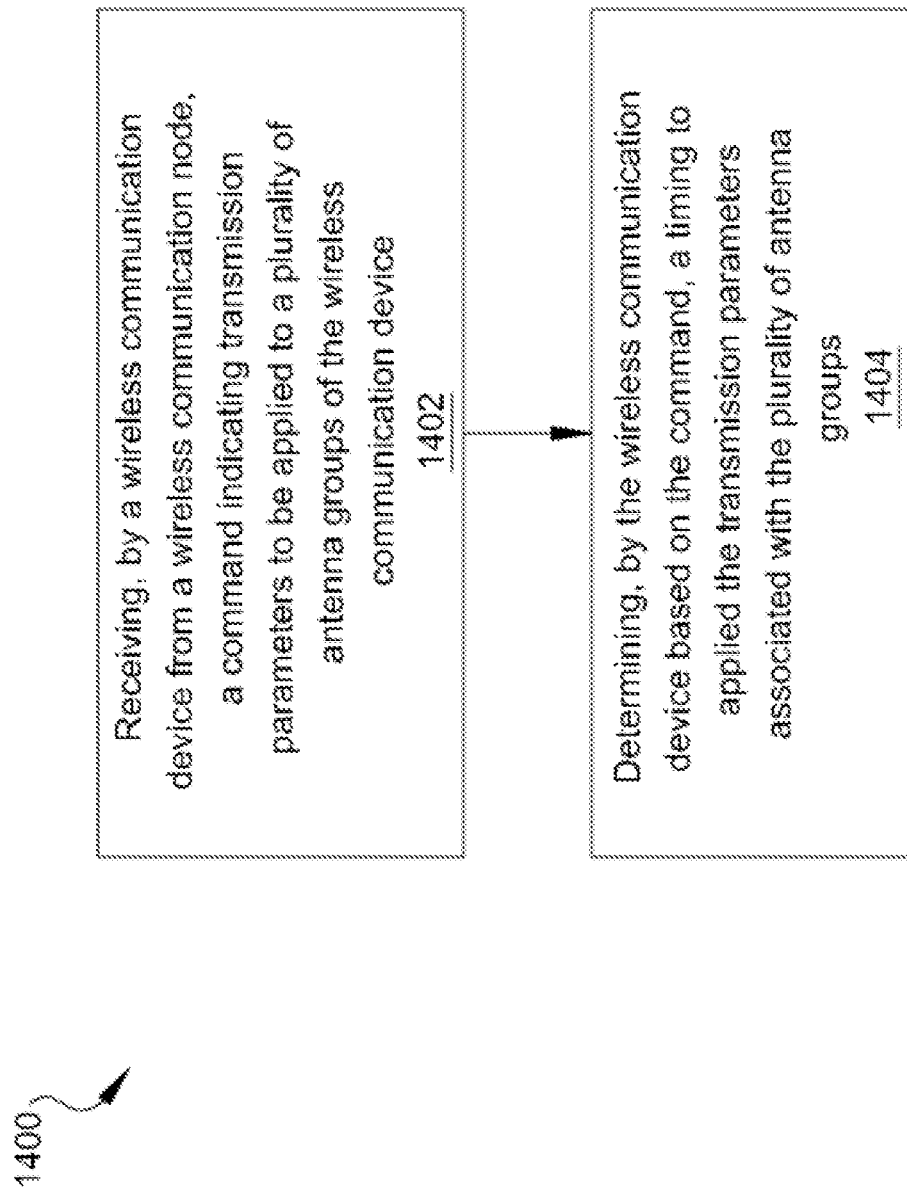
FIG. 14 is a flow diagram depicting a method for panel-specific reporting for DL and UL transmission from the perspective of a wireless communication device, in accordance with some embodiments of the present disclosure.

FIG. 14 is a flow diagram depicting a method for panel-specific reporting for DL and UL transmission from the perspective of a wireless communication device, in accordance with some embodiments of the present disclosure. Additional, fewer, or different operations may be performed in the method depending on the particular embodiment. In some embodiments, some or all operations of method 1400 may be performed by a wireless communication node, such as BS 102 in FIG. 1. In some operations, some or all operations of method 1400 may be performed by a wireless communication device, such as UE 104 in FIG. 1. Each operation may be re-ordered, added, removed, or repeated As shown, the method 1400 includes the operation 1402 of receiving, by a wireless communication device from a wireless communication node, a command indicating transmission parameters to be applied to a plurality of antenna groups of the wireless communication device. The method 1400 includes the operation 1404 of determining, by the wireless communication device based on the command, a timing to applied the transmission parameters associated with the plurality of antenna groups.

FIG. 15 is a flow diagram depicting a method for panel-specific reporting for DL and UL transmission from the perspective of a wireless communication node, in accordance with some embodiments of the present disclosure. Additional, fewer, or different operations may be performed in the method depending on the particular embodiment. In some embodiments, some or all operations of method 1500 may be performed by a wireless communication node, such as BS 102 in FIG. 1. In some operations, some or all operations of method 1500 may be performed by a wireless communication device, such as UE 104 in FIG. 1. Each operation may be re-ordered, added, removed, or repeated.

As shown, the method 1500 includes the operation 1502 of receiving, by a wireless communication node from a wireless communication device, a report including respective states that the wireless communication device determines to which a plurality of antenna groups are to be applied or information about the plurality of antenna groups, wherein the plurality of antenna groups are associated with the wireless communication device.

As used herein, the definition of "beam" is equivalent to quasi-co-location (QCL) state, transmission configuration indicator (TCI) state, spatial relation state (also called as spatial relation information state), reference signal (RS), spatial filter or pre-coding. Specifically, the definition of "Tx beam" is equivalent to QCL state, TCI state, spatial relation state, DL/UL reference signal (such as channel state information reference signal (CSI-RS), synchronization signal block (SSB) (which is also called as SS/PBCH), demodulation reference signal (DMRS), sounding reference signal (SRS), and physical random access channel (PRACH)), Tx spatial filter or Tx precoding. The definition of "Rx beam" is equivalent to QCL state, TCI state, spatial relation state, spatial filter, Rx spatial filter or Rx precoding. The definition of "beam ID" is equivalent to QCL state index, TCI state index, spatial relation state index, reference signal index, spatial filter index or precoding index.

As used herein, the spatial filter can be either UE-side or gNB-side one, and the spatial filter is also called as spatial-domain filter.

As used herein, "spatial relation information" is comprised of one or more reference RSs, which is used to represent "spatial relation" between targeted "RS or channel" and the one or more reference RSs, where "spatial relation" means the same/quasi-co beam(s), same/quasi-co spatial parameter(s), or same/quasi-co spatial domain filter(s).

As used herein, "QCL state" is comprised of one or more reference RSs and their corresponding QCL type parameters, where QCL type parameters include at least one of the following aspect or combination: [1] Doppler spread, [2] Doppler shift, [3] delay spread, [4] average delay, [5]

average gain, and [6] Spatial parameter. As used herein, "TCI state" is equivalent to "QCL state".

As used herein, the definition of "beam group" is that different Tx beams within one group can be simultaneously received or transmitted, and/or Tx beams between different groups may NOT be simultaneously received or transmitted. Furthermore, the definition of "beam group" is described from the UE perspective.

As used herein, the definition of "antenna group" is that different Tx beams within one group may NOT be simultaneously received or transmitted, and/or Tx beams between different groups can be simultaneously received or transmitted.

As used herein, the definition of "antenna group" is that more than N different Tx beams within one group can NOT be simultaneously received or transmitted, and/or no more than N different Tx beams within one group can be simultaneously received or transmitted, where N is positive integer.

As used herein, the definition of "antenna group" is that Tx beams between different groups can be simultaneously received or transmitted.

As used herein, the definition of "antenna group" is described from the UE perspective.

As used herein, the antenna group is equivalent to antenna port group, panel or UE panel. Furthermore, antenna group switching is equivalent to panel switching.

As used herein, the "group ID" is equivalent to "resource set ID", "panel ID", "sub-array ID", "antenna group ID", "antenna port group ID", "ID for group of antenna port", "beam group ID", "transmission entity/unit", or "reception entity/unit". Furthermore, the "group ID" is to represent the UE panel and some features related to the UE panel. Furthermore, the "group ID" is equivalent to "group state".

As used herein, "time unit" can be sub-symbol, symbol, slot, subframe, frame, or transmission occasion.

As used herein, the active antenna group can be equivalent to active DL antenna group only, active UL antenna group only, or active DL and UL antenna group.

As used herein, the UL power control parameter includes target power (also called as PO), path loss RS, scaling factor for path loss (also called as alpha), closed loop process.

As used herein, "the report is transmitted", "transmitting the report" or "the transmission of the report" is equivalent to transmitting the channel (e.g., PUSCH, PUCCH, MAC-CE, or PRACH) carrying the report, receiving the new data indication for a PUSCH carrying the report message is valid, or R time units after PUSCH carrying the report message, where R is an integer. In some embodiments, there is a further condition for "the report is transmitted successfully": the indication for new data is associated with the same HARQ process index.

As used herein, in some embodiments, the transmission parameter is equivalent to configuration parameter. In some embodiments, a transmission parameter comprise at least one of: a transmission configuration indicators (TCI), a spatial relation parameter, an uplink (UL) power control parameter sets, a DL BWP configuration parameter, a UL BWP configuration parameter, a PDCCH configuration parameter, a PDSCH configuration parameter, a PUCCH configuration parameter, a PUSCH configuration parameter, a SRS configuration parameter.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A wireless communication method, comprising:
   determining, by a wireless communication device, states to which a plurality of antenna groups are to be applied, wherein the plurality of antenna groups are associated with the wireless communication device;
   transmitting, by the wireless communication device to a wireless communication node, a report including the states or information about the plurality of antenna groups;
   determining, by the wireless communication device, transmission parameters associated with the plurality of antenna groups based at least on the states; and
   determining, by the wireless communication device, a timing to apply the transmission parameters associated with the plurality of antenna groups, as a function of a latency representing transitioning between states of the plurality of antenna groups.

2. The wireless communication method of claim 1, wherein the states include at least one of: an idle mode, an active mode, or an operative mode.

3. The wireless communication method of claim 2, wherein the active mode includes at least one of: an active mode for a downlink transmission, an active mode for an uplink transmission, an active mode for a downlink transmission and an uplink transmission.

4. The wireless communication method of claim 2, wherein the operative mode includes at least one of: an operative mode for a downlink transmission, an operative mode for an uplink transmission, an operative mode for an uplink transmission and an active mode for a downlink transmission, an operative mode for a downlink transmission and an active mode for an uplink transmission, and an operative mode for a downlink transmission and an uplink transmission.

5. The wireless communication method of claim 2, further comprising:
   responsive to determining the respective states of one or more antenna groups of the plurality of antenna groups into the idle mode:
      preventing, by the wireless communication device, the one or more antenna groups of the plurality of antenna groups from performing a transmission.

6. The wireless communication method of claim 2, further comprising:
   allowing, by the wireless communication device responsive to determining the respective states of one or more antenna groups of the plurality of antenna groups into the active mode or the operative mode, the one or more antenna groups of plurality of antenna groups to perform a transmission.

7. The wireless communication method of claim 2, further comprising:
   allowing, by the wireless communication device responsive to determining the respective states of one or more antenna groups of the plurality of antenna groups into the active mode or the operative mode, transmission parameters associated with the one or more antenna groups of the plurality of antenna groups or the plurality of antenna groups to be applied for a transmission.

8. The wireless communication method of claim 1, further comprising:
   an uplink (UL) transmission is performed with the plurality of antenna groups; or,
   allowing the transmission parameters associated with the plurality of antenna groups to be applied for a transmission.

9. The wireless communication method of claim 1, wherein the information about the plurality of antenna groups comprises an index associated with the plurality of antenna groups or one or more indexes associated with the respective antenna groups within the plurality of antenna groups, wherein the respective states of the plurality of antenna groups correspond with an active mode.

10. The wireless communication method of claim 1, wherein the information about the plurality of antenna groups comprises an index associated with the plurality of antenna groups, one or more indexes associated with the respective antenna groups within the plurality of antenna groups, or information indicating activation or deactivation.

11. The wireless communication method of claim 1, wherein the information about the plurality of antenna groups further comprises an index associated with the plurality of antenna groups or one or more indexes associated with the respective antenna groups within the plurality of antenna groups, wherein the respective states of the plurality of antenna groups are switched.

12. The wireless communication method of claim 1, wherein the states comprise a bitmap, and wherein bits of the bitmap are associated with the respective antenna groups within the plurality of antenna groups.

13. The wireless communication method of claim 1, wherein the report further comprises one or more reference signal (RS) resources.

14. The wireless communication method of claim 13, wherein the respective states of the plurality of antenna groups corresponds with an active mode.

15. The wireless communication method of claim 1, further comprising:
    transmitting, by the wireless communication device to the wireless communication node, a maximum number of antenna groups having respective states corresponding with an active mode.

16. The wireless communication method of claim 1, further comprising:
    transmitting, by the wireless communication device to the wireless communication node, a maximum number of antenna groups having respective states corresponding with an operative mode.

17. The wireless communication method of claim 1, further comprising:
    detecting, by the wireless communication device, an occurrence of at least one of an internal overheating associated with the wireless communication device, a maximum power reduction greater than or equal to a first predetermined threshold, an uplink (UL) power backoff greater than or equal to a second predetermined threshold, a Block Error Rate (BLER) greater than or equal to a third predetermined threshold, or a Reference Signal Receive Power (RSRP) less than or equal to a fourth predetermined threshold; and
    initiating, by the wireless communication device responsive to detecting the occurrence, the transmission of assistance information of a configurable bound for antenna group related parameters.

18. The wireless communication method of claim 1, further comprising:
    applying, by the wireless communication device, the plurality of antenna groups across all cells, a cell group, or a Control Resource Set (CORESET) group.

19. The wireless communication method of claim 1, wherein the wireless communication device transmits the report via a Physical Uplink Shared Channel (PUSCH), a Physical Uplink Control Channel (PUCCH), a PRACH (Physical Random Access Channel), or a Media Access Control-Control Element (MAC-CE).

20. A wireless communication device, comprising:
    at least one processor configured to:
    determine states to which a plurality of antenna groups are to be applied, wherein the plurality of antenna groups are associated with the wireless communication device;
    transmit, via a transmitter to a wireless communication node, a report including the states or information about the plurality of antenna groups;
    determine transmission parameters associated with the plurality of antenna groups based at least on the states; and
    determine a timing to apply the transmission parameters associated with the plurality of antenna groups, as a function of a latency representing transitioning between states of the plurality of antenna groups.

* * * * *